United States Patent [19]

Hopf et al.

[11] Patent Number: 5,279,762

[45] Date of Patent: * Jan. 18, 1994

[54] SMECTIC LIQUID CRYSTAL PHASES

[75] Inventors: Reinhard Hopf, Berlin, Fed. Rep. of Germany; Bernhard Scheuble, Yokohama, Japan; Reinhard Hittich, Modautal, Fed. Rep. of Germany; Joachim Krause, Dieburg, Fed. Rep. of Germany; Volker Reiffenrath, Darmstadt, Fed. Rep. of Germany; Eike Poetsch, Mühltal, Fed. Rep. of Germany; Thomas Geelhaar, Mainz, Fed. Rep. of Germany; Rudolf Eidenschink, Münster, Fed. Rep. of Germany

[73] Assignee: Merck Patent Gesellschaft Mit Beschrankter Haftung, Darmstadt, Fed. Rep. of Germany

[*] Notice: The portion of the term of this patent subsequent to Nov. 12, 2008 has been disclaimed.

[21] Appl. No.: 746,371

[22] Filed: Aug. 16, 1991

Related U.S. Application Data

[60] Division of Ser. No. 426,466, is a continuation of Ser. No. 18,947, Dec. 24, 1986, abandoned.

[30] Foreign Application Priority Data

Apr. 27, 1985 [DE] Fed. Rep. of Germany ....... 3515374

[51] Int. Cl.$^5$ ..................... C09K 19/34; C09K 19/52; C07D 239.02; C07D 211/70
[52] U.S. Cl. .......................... 252/299.61; 252/299.01; 544/298; 544/335; 546/339
[58] Field of Search ............................. 544/298, 335; 252/299.61, 299.01; 546/339

[56] References Cited

U.S. PATENT DOCUMENTS 4,311,610 1/1982 Zaschke et al. ................. 252/299.61
4,452,718 6/1984 Schadt et al. .................... 252/299.61

(List continued on next page.)

FOREIGN PATENT DOCUMENTS 0159872 10/1985 European Pat. Off. .
0174816 3/1986 European Pat. Off. .

(List continued on next page.)

OTHER PUBLICATIONS

Demus et al., "Flüssige Kristalle in Tabellen," VEB Deutscher Verlag für Grundstoffindustrie, Liepzig, pp. 260-261 (1974).

(List continued on next page.)

Primary Examiner—Robert L. Stoll
Assistant Examiner—C. Harris
Attorney, Agent, or Firm—Millen, White, Zelano & Branigan

[57] ABSTRACT

Compounds of the formula I $$R^1-A^1-A^2-R^2 \quad I$$

wherein
$R^1$ and $R^2$ are each alkyl with 1-15 C atoms, and wherein one or two non-adjacent $CH_2$ groups can also be replaced by —O—, —S—, —CO—, —O—CO—, —CO—O—, —CO—S—, —S—CO—, —CH-Halogen—, —CHCN— and/or —CH=CH—,
$A^1$ is 1,4-phenylene, trans-1,4-cyclohexylene or a single bond and
$A^2$ is

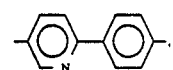

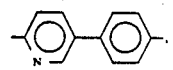

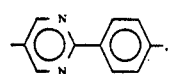

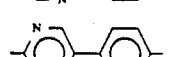

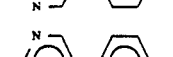

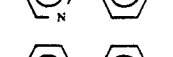

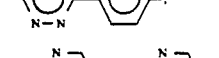

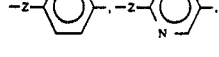

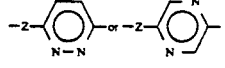

in which Z is —O—CO—, —CO—O—, —S—CO—, —CO—S—, $CH_2O$—, —$OCH_2$— or —$CH_2CH_2$—, with the proviso that, if $A^1$ is a single bond, $A^2$ is

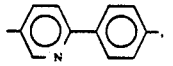

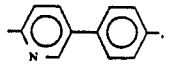

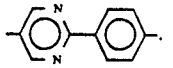

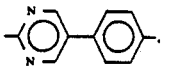

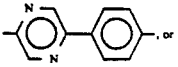

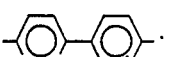 , or

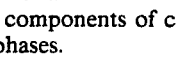

are suitable as components of chirally tilted smectic liquid crystal phases.

64 Claims, No Drawings

U.S. PATENT DOCUMENTS

| | | | |
|---|---|---|---|
| 4,462,923 | 7/1984 | Boller et al. | 252/299.61 |
| 4,512,636 | 4/1985 | Andrews et al. | 359/103 X |
| 4,533,488 | 8/1985 | Fukui et al. | 252/299.61 |
| 4,564,694 | 1/1986 | Hirai et al. | 560/1 |
| 4,595,521 | 6/1986 | Petrzilka et al. | 252/299.61 |
| 4,621,901 | 11/1986 | Petrzilka et al. | 359/103 X |
| 4,622,163 | 11/1986 | Huynh-Ba et al. | 252/299.61 |
| 4,622,165 | 11/1986 | Kano et al. | 252/299.65 |
| 4,632,515 | 12/1986 | Gray et al. | 359/103 X |
| 4,643,841 | 2/1987 | Ishii et al. | 252/299.61 |
| 4,657,695 | 4/1987 | Saito et al. | 252/299.61 |
| 4,684,220 | 8/1987 | Shionozaki et al. | 359/103 X |
| 4,713,197 | 12/1987 | Eidenschink et al. | 252/299.6 |
| 4,721,367 | 1/1988 | Yoshinaga et al. | 359/104 X |
| 4,725,688 | 2/1988 | Taguchi et al. | 544/298 |
| 4,752,413 | 6/1988 | Inoue et al. | 252/299.61 |
| 4,776,973 | 10/1988 | Bofinger et al. | 252/299.61 |
| 4,780,241 | 10/1988 | Furukawa et al. | 252/299.63 |
| 4,781,857 | 11/1988 | Inoue et al. | 252/299.61 |
| 4,874,542 | 10/1989 | Higuchi et al. | 252/299.61 |
| 4,882,083 | 11/1989 | Terashima et al. | 252/299.61 |
| 4,882,086 | 11/1989 | Terashima et al. | 252/299.61 |
| 4,886,620 | 12/1989 | Hopf et al. | 252/299.61 |
| 4,892,393 | 1/1990 | Terashima et al. | 359/104 X |
| 4,906,400 | 3/1990 | Saito et al. | 252/299.61 |
| 4,906,401 | 3/1990 | Dübal et al. | 252/299.61 |
| 4,906,752 | 3/1990 | Müller et al. | 544/318 |
| 4,913,532 | 4/1990 | Yoshida et al. | 359/103 X |
| 5,075,032 | 12/1991 | Hopf et al. | 252/299.63 |

FOREIGN PATENT DOCUMENTS

| | | |
|---|---|---|
| 0191600 | 8/1986 | European Pat. Off. |
| 0206228 | 12/1986 | European Pat. Off. |
| 0207712 | 1/1987 | European Pat. Off. |
| 0255195 | 6/1987 | European Pat. Off. |
| 3515073 | 11/1986 | Fed. Rep. of Germany |
| 3600052 | 7/1987 | Fed. Rep. of Germany |
| 3518734 | 11/1987 | Fed. Rep. of Germany |
| 129699 | 2/1978 | German Democratic Rep. |
| 145912 | 1/1981 | German Democratic Rep. |
| 240386 | 10/1986 | German Democratic Rep. |
| 59-98065 | 6/1984 | Japan |
| 60-78972 | 5/1985 | Japan |
| 60-92276 | 5/1985 | Japan |
| 60-190969 | 10/1985 | Japan |
| 60-193969 | 10/1985 | Japan |
| 61-17571 | 1/1986 | Japan |
| 61-24571 | 2/1986 | Japan |
| 61-251672 | 11/1986 | Japan |
| 62-00071 | 1/1987 | Japan |
| 86/00067 | 1/1986 | World Int. Prop. O. |
| 86/00087 | 1/1986 | World Int. Prop. O. |

OTHER PUBLICATIONS

Demus et al., "Flüssige Kristalle in Tabellen II," VEB Deutscher Verlag für Grundstoffindustrie, Liepzig, pp. 344–400 (1984).

Gray et al., "Liquid Crystals & Plastic Crystals," vol. 1, pp. 142–143 and 165–166 (1974).

Pavluchenko et al., "Liquid Crystalline Pyridine Derivatives," *Advances in Liquid Crystal Research and Applications,* L. Bata, Ed., Pergamon Press, Oxford, pp. 1007–1013 (1980).

Zaschke, "Heterocyclic Liquid Crystals," *Advances in Liquid Crystal Research and Applications,* L. Bata, Ed., Pergamon Press, Oxford, pp. 1059–1074 (1980).

*Pavluchenko et al., J. de Physique, Coll C3, vol. 40, No. 4, pp. 62-1-4 (1979).

SMECTIC LIQUID CRYSTAL PHASES

This is a division of application Ser. No. 07/426,466, filed Oct. 20, 1989, now U.S. Pat. No. 5,064,566, which is a continuation of Ser. No. 07/018,947, filed Dec. 24, 1986, now abandoned.

The invention relates to the use of compounds of the formula I $$R^1-A^1-A^2-R^2 \qquad I$$

wherein $R^1$ and $R^2$ are each alkyl with 1–15 C atoms, and wherein one or two non-adjacent $CH_2$ groups can also be replaced by —O—, —S—, —CO—, —O—CO—, —CO—O—, —CO—S—, —S—CO—, —CH-Halogen—, —CHCN— and/or —CH=CH—, $A^1$ is 1,4-phenylene, trans-1,4-cyclohexylene or a single bond and $A^2$ is

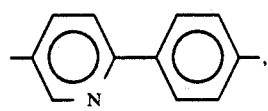

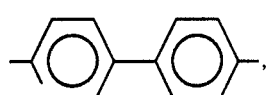

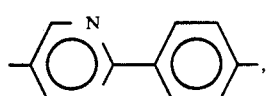

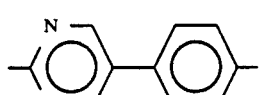

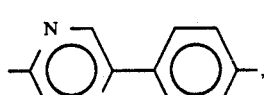

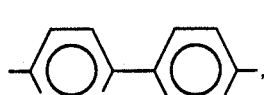

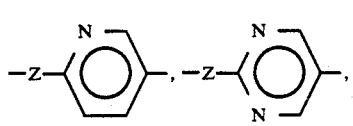

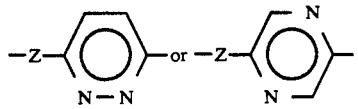

in which Z is —O—CO—, —CO—O—, —S—CO—, —CO—S—, —CH$_2$O—, —OCH$_2$— or —CH$_2$CH$_2$—, with the proviso that if $A^1$ is a single bond, $A^2$ is

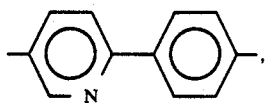

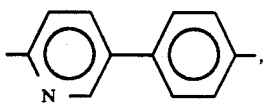

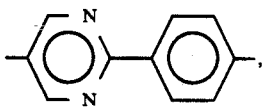

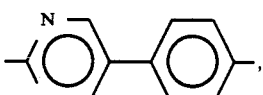

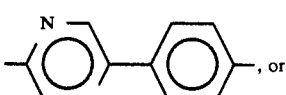

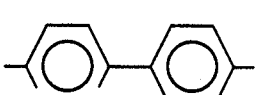

as components of chirally tilted smectic liquid crystal phases, and chiral tilted smectic liquid crystal phases containing compounds of the formula I.

Chiral tilted smectic liquid Crystal phases with ferroelectric properties can be prepared by adding a suitable chiral doping substance to base mixtures with one or more tilted smectic phases (L. A. Beresnev et al., Mol. Cryst. Liq. Cryst. 89, 327 (1982); H. R. Brand et al., J. Physique 44 (lett.), L-771 (1983)). Such phases can be used as dielectrics for rapidly switching displays based on the principle of SSFLC technology described by Clark and Lagerwall (N. A. Clark and S. T. Lagerwall, Appl. Phys. Lett. 36, 899 (1980); U.S. Pat. No. 4,367,924) on the basis of ferroelectric properties of the chirally tilted phase. In this phase, the longitudinally stretched molecules are arranged in layers, the molecules having a tilt angle relative to the normal of the layers. On advancing from layer to layer, the tilt direction changes by a small angle in respect of an axis vertical to the layers, so that a helix structure is formed. In displays based on the principle of SSFLC technology, the smectic layers are arranged vertical to the plates of the cell. The helical arrangement of the tilt direction of the molecules is suppressed by a very small distance between the plates (about 1–2 μm). The longitudinal axes of the molecules are thereby forced to align themselves in a plane parallel to the plates of the cell, which means that two distinct tilt orientations result. By applying a suitable alternating electrical field, a system can be switched back and forth between these two states in the liquid crystal phase which exhibits spontaneous polarization. This switching process is considerably more rapid than in conventional twisted cells (TN-LCDs) based on nematic liquid crystals.

A great disadvantage for many applications of the materials currently available with chirally tilted smectic phases (such as, for example, Sc*, but also $S_H^*$, $S_I^*$, $S_J^*$, $S_K^*$, $S_G^*$ and $S_F^*$) is their low chemical, heat and light stability. Another adverse property of displays based on the chirally tilted smectic mixtures currently available is that values of the spontaneous polarization are too low, so that the switch time properties of the displays are adversely influenced and/or the pitch and/or the tilt and/or the viscosity of the phases do not meet the requirements of display technology. Moreover, the temperature range of the ferroelectric phases is usually too small and is predominantly at temperatures which are too high.

It has now been found that the use of compounds of the formula I as components of chirally tilted smectic mixtures can substantially reduce the disadvantages mentioned. The compounds of the formula I are thus outstandingly suitable as components of chirally tilted smectic liquid crystal phases. In particular, chirally tilted smectic liquid crystal phases which are particularly chemically stable, have favourable ferroelectric phase ranges and favourable viscosity values, in particular broad Sc* phase ranges, have an outstanding behaviour on supercooling down to temperatures below 0° C. without crystallization occurring and have high spontaneous polarization values for such phases can be prepared with the aid of these compounds. P is the spontaneous polarization in nC/cm².

Although it has been disclosed that, among the compounds of the formula I, the 5-n-alkyl-2-(4-n-alkoxyphenyl)pyrimidines can be used as compounds of smectic liquid crystal materials for thermography (East German Patent 148,676) or as components of guest-host mixtures in electrooptical assemblies (East German Patent 129,699), no information at all is given there which indicates that these compounds can be used as components of chirally tilted smectic mixtures for ferroelectric displays based on, for example, the SSFLC technology described by Clark and Largerwall.

The compounds of the formula I have a wide range of applications. Depending on the choice of substituents, these compounds can be used as base materials from which liquid crystal smectic phases are predominantly composed; however, it is also possible for compounds of the formula I to be added to liquid crystal base materials from other classes of compounds, for example in order to vary the dielectric and/or optical anisotropy and/or the viscosity and/or the spontaneous polarization and/or the phase ranges and/or the tilt angle and/or the pitch of such a dielectric.

The invention thus relates to the use of the compounds of the formula I as components of chirally tilted smectic liquid crystal phases. The invention furthermore relates to chirally tilted smectic liquid crystal phases containing at least one compound of the formula I and liquid crystal display elements, in particular ferroelectric electrooptical display elements, containing such phases.

The phases according to the invention contain preferably at least three and in particular at least five compounds of the formula I. Particularly preferred chirally tilted smectic liquid crystal phases according to the invention are those in which the achiral base mixture contains, in addition to compounds of the formula I, at least one other component with a negative or comparatively low positive dielectric anisotropy. This/these other component(s) of the achiral base mixture can make up 1 to 50%, preferably 10 to 25%, of the base mixture. Suitable further components with a comparatively low positive or negative dielectric anisotropy are compounds of the formula II, which includes the compounds of the part formulae IIa to IIi:

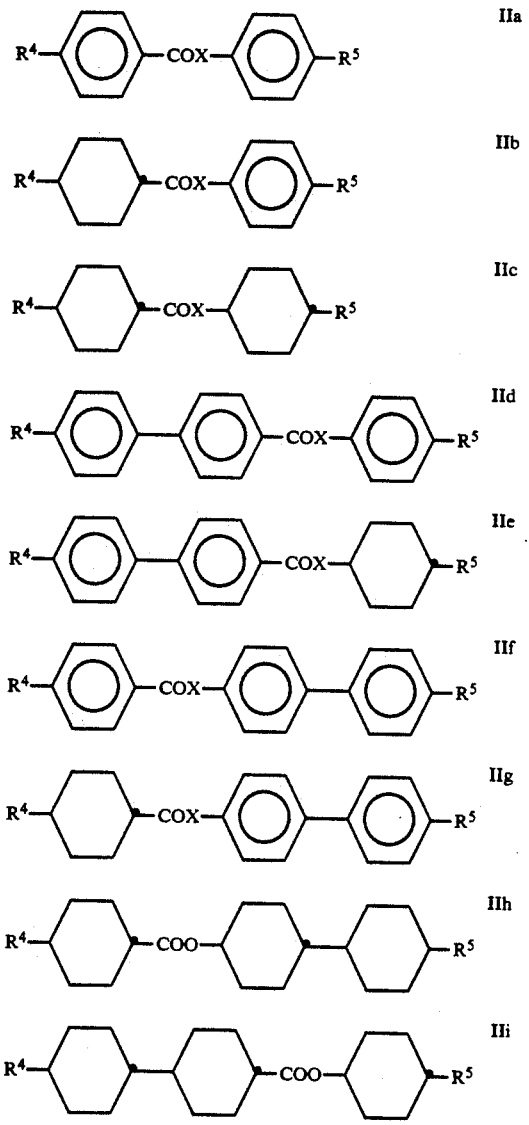

$R^4$ and $R^5$ are in each case preferably straight-chain alkyl, alkoxy, alkanoyloxy or alkoxycarbonyl with in each case 3 to 12 C atoms. X is preferably O. In the compounds of the formulae IIa, IIb, IId, IIe, IIf and IIg, it is also possible for a 1,4-phenylene group to be laterally substituted by halogen or CN, particularly preferably by fluorine.

Particularly preferred compounds are those of the part formulae IIa, IIb, IId and IIf, wherein $R^4$ and $R^5$ are each straight-chain alkyl or alkoxy with in each case 5 to 10 C atoms.

Particularly preferred individual compounds are shown in the following table:

| Formula | $R^4$ | $R^5$ | X |
| --- | --- | --- | --- |
| IIa | n-Decyloxy | n-Heptyloxy | O |
| IIa | n-Hexyloxy | n-Decyloxy | O |
| IIa | n-Octyloxy | n-Heptyl | O |
| IIa | n-Octyloxy | n-Pentyl | O |
| IIa | n-Decyloxy | n-Heptyl | O |

-continued

| Formula | R⁴ | R⁵ | X |
|---|---|---|---|
| IIa | n-Decyloxy | n-Pentyl | O |
| IIf | n-Pentyl | n-Pentyl | O |
| IIf | n-Pentyl | n-Hexyl | O |

The compounds of the part formulae IIc, IIh and IIi are suitable as additives for lowering the melting point and are usually added to the base mixtures in an amount of not more than 5%, preferably 1 to 3%. R⁴ and R⁵ in the compounds of the part formulae IIc, IIh and IIi are preferably straight-chain alkyl with 2 to 7, preferably 3 to 5, C atoms. Another class of compound which is suitable for lowering the melting point in the phases according to the invention is that of the formula

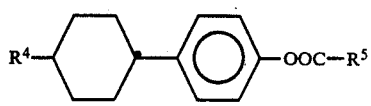

wherein R⁴ and R⁵ have the preferred meaning given for IIc, IIh and IIi.

Suitable further components with negative dielectric anisotropy are furthermore compounds containing the structural element A, B or C

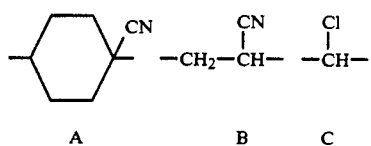

Preferred compounds of this type correspond to the formulae IIIa, IIIb and IIIc:

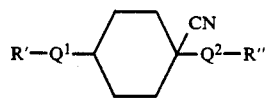 IIIa

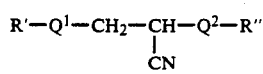 IIIb

R¹—Q³—Q⁴—R'''     IIIc

R' and R" are each preferably straight-chain alkyl or alkoxy groups with in each case 2 to 10 C atoms. Q¹ and Q² are each 1,4-phenylene, trans-1,4-cyclohexylene, 4,4'-biphenylyl, 4-(trans-4-cyclohexyl)-phenyl or trans,-trans-4,4'-bicyclohexyl, or one of the groups Q¹ and Q² is also a single bond.

Q³ and Q⁴ are each 1,4-phenylene, 4,4'-biphenylyl or trans-1,4-cyclohexylene. One of the groups Q³ and Q⁴ can also be 1,4-phenylene, at least one CH group being replaced by N. R''' is an optically active radical with an asymmetric carbon atom of the structure

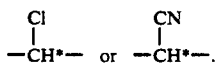

Particularly preferred compounds of the formula IIIc are those of the formula IIIc':

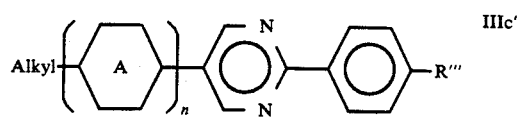

wherein A is 1,4-phenylene or trans-1,4-cyclohexylene and n is 1 or 1.

The compounds of the formula I include dinuclear and trinuclear materials. Of the dinuclear materials, which are preferred, those wherein R¹ is n-alkyl with 7 to 10 and in particular 7 to 9 C atoms are preferred. Compounds of the formula I where R¹=n-heptyl or n-octyl impart good low temperature properties to the phases according to the invention, whilst the corresponding compounds with R¹=n-nonyl are capable of increasing the $S_A/S_C$ transition temperature of the phases according to the invention.

Preferred phases according to the invention contain at least one compound of the formula I wherein R¹ is n-nonyl and at least one compound of the formula I wherein R¹ is n-heptyl or n-octyl. Particularly preferred phases according to the invention are those containing compounds of the formula I wherein R¹ is n-heptyl, n-octyl or n-nonyl. R² in the dinuclear compounds of the formula I is preferably n-alkoxy with 6 to 12, in particular with 7 to 10, C atoms. The phases according to the invention preferably contain at least one compound of the formula I wherein R² is n-hexyloxy, n-heptyloxy or n-octyloxy (preferably n-heptyloxy or n-octyloxy) and at least one compound of the formula I wherein R² is n-nonyloxy or n-decyloxy. The sum of the C atoms in the groups R¹ and R² of the preferred dinuclear compounds of the formula I is preferably 15 or more, particularly preferably in the range from 15 to 20. Particularly preferred individual compounds of the formula I are listed in the following table:

| R¹ | R² | A¹ |
|---|---|---|
| n-Nonyl | n-Nonyloxy | — |
| n-Nonyl | n-Hexyloxy | — |
| n-Octyl | n-Decyloxy | — |
| n-Octyl | n-Octyloxy | — |
| n-Octyl | n-Heptyloxy | — |
| n-Heptyl | n-Decyloxy | — |
| n-Heptyl | n-Nonyloxy | — |
| n-Pentyloxy | n-Octyl | ⌬ |
| n-Hexyloxy | n-Hexyl | ⌬ |
| n-Hexyloxy | n-Pentyl | ⌬ |
| n-Pentyloxy | n-Nonyl | ⌬ |

-continued

| $R^1$ | $R^2$ | $A^1$ |
|---|---|---|
| n-Octyloxy | n-Octyl |  |

Compounds of the formula I which are furthermore preferred are those wherein $R^1$ is n-alkyl with 7 to 10 C atoms and $R^2$ is n-alkanoyloxy, n-alkoxycarbonyl or n-alkylthio with in each case 5 to 10 C atoms.

The phases according to the invention preferably contain at least one trinuclear compound of the formula I and/or one compound of the formula I wherein $R^2$ is n-alkylthio. These phases are distinguished by particularly high $S_C/S_A$ transition temperatures.

However, other preferred phases according to the invention are those which merely contain compounds of the formula I in which $A^1$ is a single bond. These phases are distinguished by particularly favourable low-temperature behaviour and particularly low viscosity values. Other preferred phases according to the invention are those which contain compounds of the formula I in which at least one group $R^1$ or $R^2$ is a branched alkyl or alkoxy radical. These phases likewise exhibit favourable low-temperature behaviour.

$R^1$ and $R^2$ independently of one another are each preferably alkyl, alkoxy, alkanoyl, alkanoyloxy, alkoxycarbonyl or alkoxycarbonyloxy, each preferably having 5 to 12, in particular 6 to 10, C atoms. Alkyl and alkoxy are particularly preferred. One of the groups $R^1$ and $R^2$ is preferably alkyl. A particularly preferred combination is one in which $R^1$ is alkyl and $R^2$ is alkoxy, as well as one in which $R^1$ is alkoxy and $R^2$ is alkoxy. $R^1$ and $R^2$ groups with a straight-chain alkyl radical are particularly preferred.

Phases according to the invention which are furthermore preferred are those containing at least one dinuclear compound of the formula I wherein $R^1$ is n-alkyl with 7 to 10 C atoms and $R^2$ is —CH$_2$O—(CH$_2$)$_p$—CH$_3$ or —O— (CH$_2$)$_q$—O—(CH$_2$)$_r$—CH$_3$. p is preferably 4 to 10, in particular 5 to 9. q is preferably 1 or 2, particularly preferably 2. r is 4 to 10, particularly preferably 5 to 9. q can also be >2, for example 3 to 5.

$A^2$ is preferably
 $_2)_q$—O—(CH$_2$)$_r$—CH$_3$. p is preferably 4 to 10, in particular 5 to 9. q is preferably 1 or 2, particularly preferably 2. r is 4 to 10, particularly preferably 5 to 9. q can also be >2, for example 3 to 5.

$A^2$ is preferably

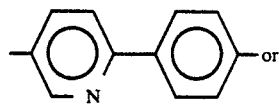

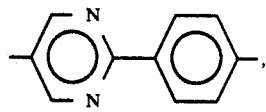

and particular preferably

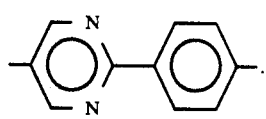

$A^1$ is preferably a single bond or, where $A^2$ is

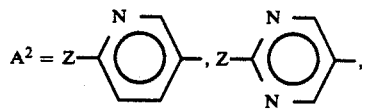

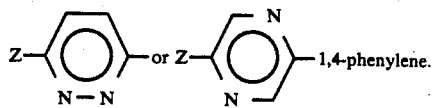 1,4-phenylene.

Z is preferably —CO—O—, —O—CO— or —CH$_2$CH$_2$—. Other preferred meanings for $A^2$ are

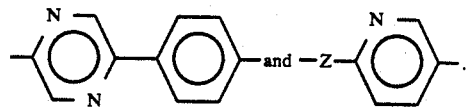

Phases according to the invention which are furthermore preferred are those containing at least one compound of the formula

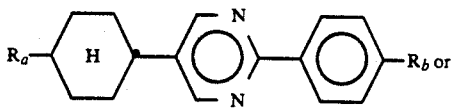

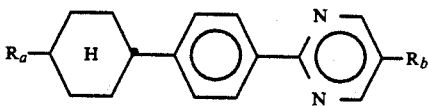

wherein $R_a$ is alkyl with 3 to 12 C atoms and $R_b$ is alkyl or alkoxy with in each case 5 to 12 C atoms. $R_a$ and $R_b$ together contain at least 15 C atoms, preferably at least 17 C atoms.

A particularly preferred chiral tilted smectic liquid crystal phase with at least one compound of the formula I according to claim 1 is characterized in that it contains a liquid crystal component with negative dielectric anisotropy, and in particular is a phase according to the invention, characterized in that it contains at least one compound containing the structural element A, B or C as the component with negative dielectric anisotropy.

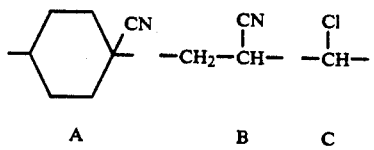

A  B  C

A particularly preferred phase according to the invention is furthermore characterized in that it contains at least one compound of the formula II $$R^4-A^1-COX-A^2-R^5 \qquad II$$

wherein $R^4$ and $R^5$ are each alkyl with 1-15 C atoms, it also being possible for one or two non-adjacent CH$_2$ groups to be replaced by —O—, —CO—, —O—CO—, —CO—O— and/or —CH=CH—, X is O or S and A¹ and A² are each 1,4-phenylene or trans-1,4-cyclohexylene, or one of the groups A¹ and A² is optionally also 4,4'-biphenylyl or trans,trans-4,4'-bicyclohexyl.

Other preferred ferroelectric phases according to the invention are those which contain at least one compound of the formula V $$R^1—Q^1—A—(Q^2)_q—R^2 \qquad V$$

wherein

R¹ and R² independently of one another are each a straight-chain alkyl group having 1 to 15 C atoms, wherein furthermore one or more non-adjacent CH₂ groups may be replaced by —O—, —S—, —CO—, —CHCH₃—O—, —CHCH₃—, —CH—halogen—, —CHCN—, —O—CO—, —O—COO—, —CO—O— and/or —CH=CH—, A is

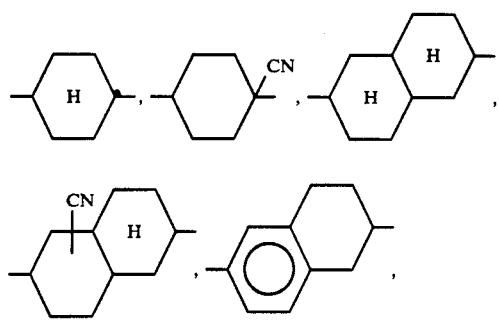

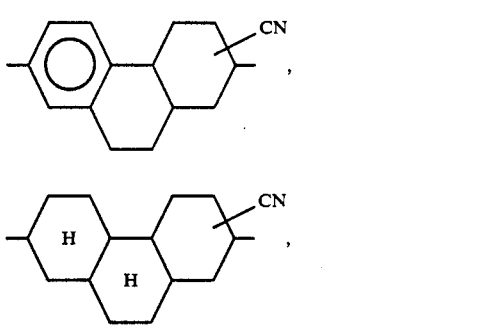

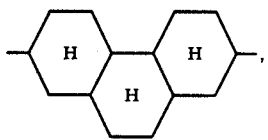

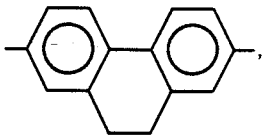

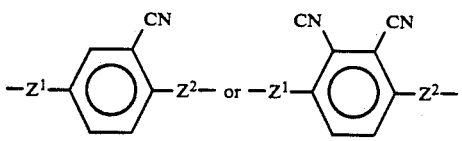

q is 0 or 1,

Q¹ and Q² independently of one another are each —(A⁰—Z⁰)$_p$—, wherein

A⁰ is 1,4-cyclohexylene which is unsubstituted or monosubstituted or polysubstituted by halogen atoms, CH₃ groups and/or nitrile groups, and wherein furthermore one or two non-adjacent CH₂ groups may be replaced by —O— and/or —S— and/or $$-\overset{|}{C}H-CH_2-$$

grouping may be replaced by $$-\overset{|}{C}=N- \quad (Cy),$$

or is 1,4-phenylene which is unsubstituted or monosubstituted or polysubstituted by halogen atoms, CH₃ groups and/or nitrile groups, wherein furthermore one or more CH groups may be replaced by N (Ph), and one of the radicals A⁰ may furthermore be 2,6-naphthylene (Na) or tetrahydro-2,6-naphthylene (4H-Na), if appropriate substituted by halogen or CN, Z⁰, Z¹ and Z² independently of one another are each —CO—O—, —O—CO—, —CH₂O—, OCH₂—, —CH₂CH₂—, —CHCNCH₂—, —CH₂—CHCN— or a single bond, and p is 1, 2, or 3, or, where A is tetra- or octahydrophenanthrene, also 0, and where A is

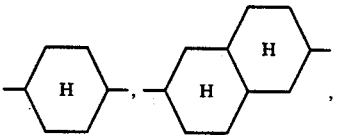

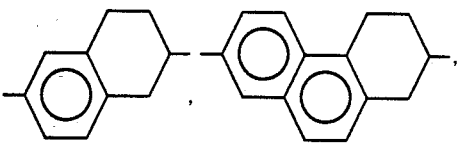

-continued

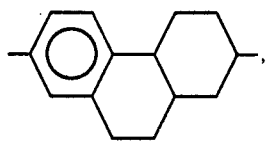

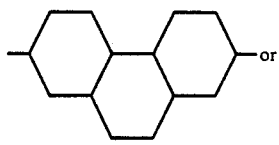 or

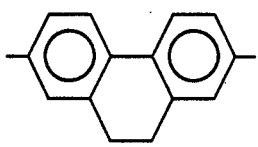

at least one group $Z^0$ is —CHCNCH$_2$— or —CH$_2$CHCN— and/or at least one CH$_2$ group in at least one of the groups R$^1$ and R$^2$ is replaced by —CHCN—.

The compounds of the formula V can have straight-chain or branched wing groups R$^1$ and/or R$^2$. Compounds possessing branched wing groups can be used in the form of the racemate or as optically active compounds. Achiral base mixtures of compounds of the formula V and, if appropriate, further achiral components can be doped with chiral compounds of the formula I or additionally with other chiral compounds, in order to obtain chirally tilted smectic phases.

Particularly preferred smaller groups of compounds of those of the formula V1 to V18:

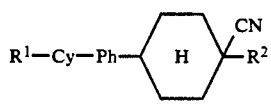 V1

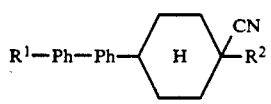 V2

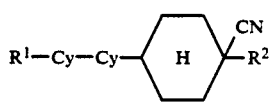 V3

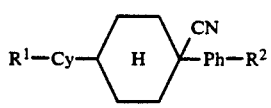 V4

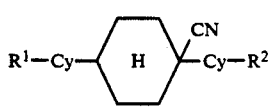 V5

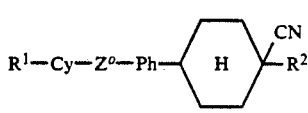 V6

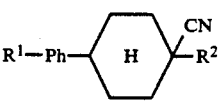 V7

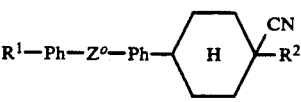 V8

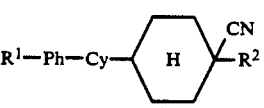 V9

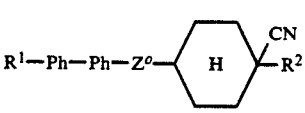 V10

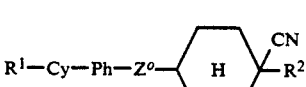 V11

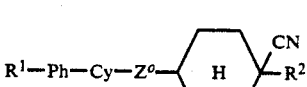 V12

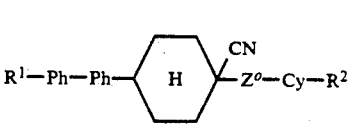 V13

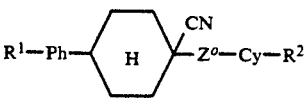 V14

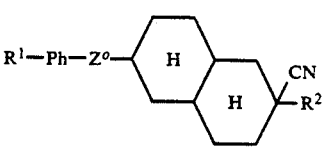 V15

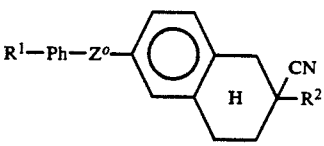 V16

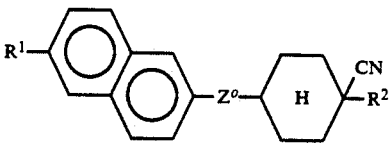 V17

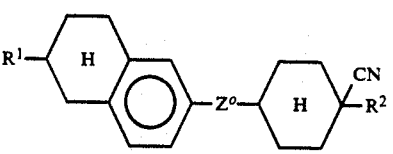 V18

Another particularly preferred smaller group of compounds comprises those of the formulae V19 to V22:

R$^1$—A$^0$—Cy—(CH$_2$)$_r$—CHCN—C$_s$H$_{2s+1}$  V19

R$^1$—A$^0$—A$^0$—Cy—(CH$_2$)$_r$—CHCN—C$_s$H$_{2s+1}$  V20

R$^1$—A$^0$—A$^0$—CHCN—CH$_2$—Cy—R$^2$  V21

R$^1$—A$^0$—A$^0$—CH$_2$—CHCN—Cy—R$^2$  V22 wherein
r is 0, 1, 2 or 3 and
(r+s) is 1 to 14.

Compounds of the formula I which do not possess any S$_c$ phases are likewise suitable as components of smectic phases according to the invention.

The phases according to the invention may furthermore contain compounds of the formula

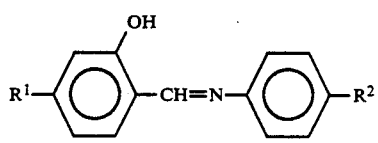

wherein R$^1$ and R$^2$ have the meaning given in the case of formula V.

All components of the phases according to the invention are either known or can be prepared in a manner known per se, analogously to known compounds.

The phases according to the invention are prepared in a manner which is customary per se. As a rule, the components are dissolved in one another, advantageously at elevated temperature.

The liquid crystal phases according to the invention can be modified by suitable additives so that they can be used in all the types of liquid crystal display elements hitherto disclosed.

The following examples are intended to illustrate the invention without limiting it. Percentages above and below are percentages by weight; all the temperatures are stated in degrees Celsius. The values given for spontaneous polarization are applicable to room temperature. The symbols are furthermore as follows: Cr: crystalline solid state, S: smectic phase (the index characterizes the phase type), N: nematic state, Ch: cholesteric phase, I: isotropic phase. The figure between two symbols indicates the transition temperature in degrees Celsius.

EXAMPLE 1

A liquid crystal phase consisting of
25% of 2-p-decyloxyphenyl-5-heptylpyrimidine,
25% of 2-p-nonyloxyphenyl-5-nonylpyrimidine,
10% of 2-p-hexyloxyphenyl-5-nonylpyrimidine,
10% of 2-p-nonyloxyphenyl-5-heptylpyrimidine,
11% of 2-p-octyloxyphenyl-5-heptylpyrimidine,
11% of 2-p-heptyloxyphenyl-5-heptylpyrimidine and
8% of 2-p-hexyloxyphenyl-5-heptylpyrimidine
can be supercooled to −1°, Cr/S$_C$ 11° and S$_C$S$_A$ 49°.

EXAMPLE 2

A liquid crystal phase consisting of
50% of 2-p-nonyloxyphenyl-5-nonylpyrimidine,
7% of 2-p-hexyloxyphenyl-5-nonylpyrimidine,
15% of 2-p-decyloxyphenyl-5-heptylpyrimidine,
7% of 2-p-nonyloxyphenyl-5-heptylpyrimidine,
7% of 2-p-octyloxyphenyl-5-heptylpyrimidine,
7% of 2-p-heptyloxyphenyl-5-heptylpyrimidine and
7% of 2-p-hexyloxyphenyl-5-heptylpyrimidine can be supercooled to 0°, Cr/S$_C$ 6° and S$_C$/S$_A$ 50°.

EXAMPLE 3

A liquid crystal phase consisting of
25% of 2-p-nonyloxyphenyl-5-nonylpyrimidine,
25% of 2-p-decyloxyphenyl-5-heptylpyrimidine,
10% of 2-p-nonyloxyphenyl-5-heptylpyrimidine,
11% of 2-p-octyloxyphenyl-5-heptylpyrimidine,
11% of 2-p-heptyloxyphenyl-5-heptylpyrimidine,
8% of 2-p-hexyloxyphenyl-5-heptylpyrimidine and
10% of p-hexyloxyphenyl trans-4-pentylcyclohexanecarboxylate can be supercooled down to −3° without crystallization occurring and has an S$_C$/S$_A$ of 44°.

EXAMPLE 4

A liquid crystal phase consisting of
25% of 2-p-decyloxyphenyl-5-heptylpyrimidine,
20% of 2-p-nonyloxyphenyl-5-heptylpyrimidine,
17% of 2-p-octyloxyphenyl-5-heptylpyrimidine,
17% of 2-p-heptyloxyphenyl-5-heptylpyrimidine,
11% of 2-p-hexyloxyphenyl-5-heptylpyrimidine and
10% of p-hexyloxyphenyl trans-4-pentylcyclohexanecarboxylate
can be supercooled to −6° without crystallization occurring and has an S$_C$/N of 32°.

EXAMPLE 5

A liquid crystal phase consisting of
22% of 2-p-decyloxyphenyl-5-octylpyrimidine,
18% of 2-p-nonyloxyphenyl-5-octylpyrimidine,
18% of 2-p-octyloxyphenyl-5-octylpyrimidine,
18% of 2-p-heptyloxyphenyl-5-octylpyrimidine,
13% of 2-p-nonyloxyphenyl-5-heptylpyrimidine and
11% of p-hexylphenyl trans-4-pentylcyclohexanecarboxylate
can be supercooled to −5° and has an S$_C$/S$_A$ of 46.1°, an A$_A$N of 57.6° and N/I of 67.6°.

EXAMPLE 6

A liquid crystal phase consisting of
20% of 2-p-nonyloxyphenyl-5-nonylpyrimidine,
10% of 2-p-nonyloxyphenyl-5-heptylpyrimidine,
18% of 2-p-decyloxyphenyl-5-octylpyrimidine,
15% of 2-p-octyloxyphenyl-5-octylpyrimidine,
12% of 2-p-heptyloxyphenyl-5-octylpyrimidine and
25% of p-hexyloxyphenyl trans-4-heptylcyclohexanecarboxylate
can be supercooled to 0° and has an S$_C$/S$_A$ of 36.9°, an S$_A$/N of 61° and N/I of 68.5°.

EXAMPLE 7

A liquid crystal phase consisting of
12% of 2-p-nonyloxyphenyl-5-heptylpyrimidine,
20% of 2-p-decyloxyphenyl-5-octylpyrimidine,
16% of 2-p-nonyloxyphenyl-5-octylpyrimidine,
16% of 2-p-octyloxyphenyl-5-octylpyrimidine,
16% of 2-p-heptyloxyphenyl-5-octylpyrimidine,
10% of p-hexyloxyphenyl trans-4-pentylcyclohexanecarboxylate and
10% of r-1-cyano-1-(trans-4-pentylcyclohexyl)-trans-4-(trans-4-heptylcyclohexyl)-cyclohexane
has an S$_C$/S$_A$ of 43.3°, an S$_A$/N of 64.5° and N/I of 75°.

EXAMPLE 8

A liquid crystal phase consisting of
12% of 2-p-nonyloxyphenyl-5-heptylpyrimidine, 20% of 2-p-decyloxyphenyl-5-octylpyrimidine,
16% of 2-p-nonyloxyphenyl-5-octylpyrimidine,
16% of 2-p-octyloxyphenyl-5-octylpyrimidine,
16% of 2-p-heptyloxyphenyl-5-octylpyrimidine,
10% of p-hexyloxyphenyl trans-4-pentylcyclohexanecarboxylate and
10% of 1-cyano-1-(trans-4-pentylcyclohexyl)-2-(trans-4-propylcyclohexyl)-ethane has an $S_C/S_A$ of 40.0°, an $S_A/N$ of 59.9° and N/I of 72.5°.

EXAMPLE 9

A liquid crystal phase consisting of
12% of 2-p-nonyloxyphenyl-5-heptylpyrimidine,
20% of 2-p-decyloxyphenyl-5-octylpyrimidine,
16% of 2-p-nonyloxyphenyl-5-octylpyrimidine,
16% of 2-p-octyloxyphenyl-5-octylpyrimidine,
16% of 2-p-heptyloxyphenyl-5-octylpyrimidine,
10% of p-hexyloxyphenyl trans-4-pentylcyclohexanecarboxylate and
10% of 1-cyano-1-(trans-4-pentylcyclohexyl)-2-[trans-4-(trans-4-pentylcyclohexyl)-cyclohexyl]-ethane has an $S_C/S_A$ of 40.5°, an $S_A/N$ of 60.6° and N/I of 72°.

EXAMPLE 10

A liquid crystal phase consisting of
12% of 2-p-nonyloxyphenyl-5-heptylpyrimidine,
20% of 2-p-decyloxyphenyl-5-octylpyrimidine,
16% of 2-p-nonyloxyphenyl-5-octylpyrimidine,
16% of 2-p-octyloxyphenyl-5-octylpyrimidine,
16% of 2-p-heptyloxyphenyl-5-octylpyrimidine,
10% of p-hexyloxyphenyl trans-4-pentylcyclohexanecarboxylate,
3.5% of trans-4-(trans-4-pentylcyclohexyl)-1-hexanoyloxycyclohexane and
6.5% of trans-4-(trans-4-heptylcyclohexyl)-1-octanoyloxycyclohexane has an $S_C/N$ of 49.5° and N/I of 68.7°.

EXAMPLE 11

A liquid crystal phase consisting of
20% of 2-p-nonyloxyphenyl-2-nonylpyrimidine,
10% of 2-p-nonyloxyphenyl-2-heptylpyrimidine,
18% of 2-p-decyloxyphenyl-2-octylpyrimidine,
15% of 2-p-nonyloxyphenyl-2-octylpyrimidine,
15% of 2-p-octyloxyphenyl-2-octylpyrimidine,
12% of 2-p-heptyloxyphenyl-2-octylpyrimidine and
10% of r-1-cyano-cis-4-(trans-4-butylcyclohexyl)-1-butylcyclohexane has an $S_C/S_A$ of 34.5°, an $S_A/N$ of 56.6° and N/I of 66.0°.

EXAMPLE 12

A liquid crystal phase consisting of
20% of 2-p-nonyloxyphenyl-5-nonylpyrimidine,
10% of 2-p-nonyloxyphenyl-5-heptylpyrimidine,
18% of 2-p-decyloxyphenyl-5-octylpyrimidine,
15% of 2-p-nonyloxyphenyl-5-octylpyrimidine,
15% of 2-p-octyloxyphenyl-5-octylpyrimidine,
12% of 2-p-heptyloxyphenyl-5-octylpyrimidine and
10% of p-hexyloxyphenyl trans-4-pentylcyclohexanecarboxylate is doped with various amounts of the chiral compound 1-methylheptyl p-(p-hexyloxybenzoyloxy)-benzoate. The phase transition temperatures and the spontaneous polarization values of the mixture obtained with this are given in the following table. The value given for P are in each case for 10° below the Sc*/$S_A$* transition point.

| X | $S_C$* | Addition of X% of the chiral doping substance | | I | P |
|---|---|---|---|---|---|
| | | $S_A$* | Ch | | |
| 0.95 | 40.5 | 65.0 | 69.1 | | 0.05 |
| 1.95 | 45.5 | 65.1 | 68.9 | | 0.12 |
| 3.11 | 41.3 | 65.2 | 68.6 | | 0.21 |
| 4.07 | 37.3 | 65.0 | 67.7 | | 0.33 |
| 4.93 | 29.5 | 64.8 | 66.9 | | 0.43 |
| 7.36 | 19.7 | 64.7 | 66.1 | | 0.60 |
| 9.96 | — | 64.5 | 65.2 | | |

EXAMPLE 13

The liquid crystal phase from Example 12 is doped with 1.09 (2.07) % of the chiral compound 4-(1-methylpropoxy)-4'-cyanobiphenyl. The doped phase has an $S_C$*/$S_A$* of 42.4 (26.5), $S_A$*/Ch 65.7 (67.4) and Ch/I 68.9 (68.8).

EXAMPLE 14

The liquid crystal phase from Example 12 is doped with 1.10 (1.96) % of the chiral compound 4-(1-methylpropyl)-4'-cyanobiphenyl. The doped phase has an $S_C$*/$S_A$* of 42.9 (26.9).

EXAMPLE 15

The liquid crystal phase from Example 12 is doped with various amounts of the chiral compound p-hexylphenyl p-(p-2-methylbutylphenyl)-benzoate. The phase transition temperatures of the mixtures thus obtained are shown in the following table:

| X | $S_C$* | Addition of X% of the chiral doping substance | | I |
|---|---|---|---|---|
| | | $S_A$* | Ch | |
| 1.00 | 52.3 | 65.2 | 69.7 | |
| 2.00 | 52.6 | 64.8 | 70.3 | |
| 3.02 | 52.8 | 65.0 | 70.2 | |
| 4.27 | 53.2 | 64.8 | 70.6 | |
| 6.15 | 54.7 | 64.2 | 70.4 | |
| 10.12 | 55.6 | 62.5 | 73.9 | |
| 19.97 | 56.9 | — | 80.4 | |
| 30.30 | 57.1 | — | | |
| 40.46 | 54.3 | — | | |
| 50.00 | 55.0 | — | | |

EXAMPLE 16

The liquid crystal phase from Example 12 is doped with various amounts of the chiral compound p-2-methylbutylphenyl p-(p-octylphenyl)-benzoate. The phase transition temperature of the mixtures thus obtained are shown in the following table:

| X | $S_C$* | Addition of X% of the chiral doping substance | | I |
|---|---|---|---|---|
| | | $S_A$* | Ch | |
| 1.00 | 51.5 | 65.5 | 70.0 | |
| 2.15 | 50.6 | 66.0 | 70.4 | |
| 2.94 | 49.6 | 66.3 | 70.7 | |
| 4.06 | 48.8 | 66.6 | 70.9 | |
| 5.61 | 47.4 | 67.5 | 71.6 | |
| 6.33 | 46.4 | 68.3 | 72.3 | |
| 8.01 | 44.5 | 70.3 | 72.9 | |
| 10.21 | 42.3 | 71.0 | 73.8 | |
| 15.24 | 32.2 | 72.8 | 74.8 | |
| 20.79 | <0 | | | |

EXAMPLE 17

A liquid crystal phase consisting of
13% of 2-p-nonyloxyphenyl-5-heptylpyrimidine,
22% of 2-p-decyloxyphenyl-5-octylpyrimidine,
18% of 2-p-nonyloxyphenyl-5-octylpyrimidine,
18% of 2-p-octyloxyphenyl-5-octylpyrimidine,
18% of 2-p-heptyloxyphenyl-5-octylpyrimidine and
11% of p-hexyloxyphenyl trans-4-pentylcyclohexanecarboxylate
is doped with various amounts of the chiral compound p-hexylphenyl p-(p-2-methylbutylphenyl)-benzoate. The phase transition temperatures of the mixtures thus obtained are shown in the following table:

| X | $S_C^*$ | Addition of X% of the chiral doping substance | | I |
|---|---|---|---|---|
| | | $S_A^*$ | Ch | |
| 0.5* | | 44.9 | 55.4 | 56.8 |
| 2.0* | | 47.0 | 57.1 | 68.4 |
| 5.0* | | 47.5 | 55.4 | 70.1 |
| 10.0 | | 50.5 | 58.3 | 70.5 |

*These mixtures can be supercooled to 0°.

EXAMPLE 18

A liquid crystal phase consisting of
38.3% of 2-p-nonyloxyphenyl-5-nonylpyrimidine,
2.0% of 2-p-hexyloxyphenyl-5-nonylpyrimidine,
36.1% of 2-p-decyloxyphenyl-5-heptylpyrimidine,
5.9% of 2-p-nonyloxyphenyl-5-heptylpyrimidine,
5.9% of 2-p-octyloxyphenyl-5-heptylpyrimidine,
5.9% of 2-p-heptyloxyphenyl-5-heptylpyrimidine and
5.9% of 2-p-hexyloxyphenyl-5-heptylpyrimidine
can be supercooled to below 0° and has an $S_C/S_A$ of 53.5°, an $S_A/N$ of 67.5° and N/I of 70°.

EXAMPLE 19

The liquid crystal phase from Example 18 is doped with various amounts of the chiral compound R-4-(5-hexylpyrimid-2-yl)-phenyl 2-chloropropionate. The phase transition temperatures and the spontaneous polarization values, at 20°, of the mixtures thus obtained are shown in the following table:

| X | $S_C^*$ | Addition of X% of the chiral doping substance | | I | P |
|---|---|---|---|---|---|
| | | $S_A^*$ | Ch | | |
| 3 | | 48.1 | 65 | 68.7 | 1.08 |
| 6 | | 41.0 | 64.1 | 68.1 | 2.14 |
| 10 | | 34.5 | 63 | 68 | 3.12 |

The mixture doped with 10% of the chiral material shows a tilt angle of 14.3° at a pitch height of 16.2 μm, in each case at a temperature of 20°.

EXAMPLE 20

The liquid crystal phase from Example 18 is doped with various amounts of the chiral compound R-4-(5-nonylpyrimid-2-yl)-phenyl 2-chloropropionate. The phase transition temperatures and the spontaneous polarization values of the mixtures thus obtained are shown in the following table:

| X | $S_C^*$ | Addition of X% of the chiral doping substance | | I | P |
|---|---|---|---|---|---|
| | | $S_A^*$ | Ch | | |
| 3 | | 41 | 68 | 72 | 0.50 |
| 6 | | 34.5 | 68.5 | 71 | 0.71 |
| 10 | | 26.5 | 69 | 69.5 | 0.87 |

EXAMPLE 21

The liquid crystal phase from Example 18 is doped with various amounts of the chiral compound R-4'-nonyloxybiphenyl-4-yl 2-chloropropionate. The phase transition temperatures and the spontaneous polarization values of the mixtures thus obtained are shown in the following table. The values given for P are in each case for 10° below the $S_C^*/S_A^*$ transition point.

| X | $S_C^*$ | Addition of X% of the chiral doping substance | | I | P |
|---|---|---|---|---|---|
| | | $S_A^*$ | Ch | | |
| 0.5 | | 50.1 | 64.2 | 69.3 | 0.1 |
| 2 | | 45.7 | 64 | 69 | 0.2 |
| 3 | | 42.3 | 63.7 | 68.6 | 0.3 |
| 4 | | 40.8 | 63.1 | 68.4 | 0.5 |
| 5 | | 37.1 | 62.7 | 68.1 | 0.6 |
| 10 | | 24.5 | 61 | 67.9 | 0.8 |

EXAMPLE 22

A liquid crystal phase consisting of
42% of 2-p-decanoyloxyphenyl-5-octylpyrimidine,
23% of 2-p-heptanoyloxyphenyl-5-octylpyrimidine,
18% of 2-p-octanoyloxyphenyl-5-octylpyrimidine,
10% of 2-p-hexanoyloxyphenyl-5-octylpyrimidine and
7% of 2-p-nonanoyloxyphenyl-5-octylpyrimidine
can be supercooled to about 0° and has an $S_C/S_A$ of 52°, an $S_A/N$ of 54° and N/I of 56°.

EXAMPLE 23

A liquid crystal phase consisting of
42% of 2-p-decanoyloxyphenyl-5-octylpyrimidine,
23% of 2-p-heptanoyloxyphenyl-5-octylpyrimidine,
18% of 2-p-octanoyloxyphenyl-5-octylpyrimidine,
10% of 2-p-hexanoyloxyphenyl-5-octylpyrimidine,
7% of 2-p-nonanoyloxyphenyl-5-octylpyrimidine and
7% of 2-p-octyloxycarbonylphenyl-5-nonylpyrimidine
can be supercooled to about 0° and has an $S_C/S_A$ of 46.5°, $S_A/N$ of 53° and N/I of 54.5°.

EXAMPLE 24

A liquid crystal phase consisting of
34.5% of 2-p-nonyloxyphenyl-5-nonylpyrimidine,
32.5% of 2-p-decyloxyphenyl-5-heptylpyrimidine,
2.0% of 2-p-hexyloxyphenyl-5-nonylpyrimidine,
5.0% of 2-p-nonyloxyphenyl-5-heptylpyrimidine,
5.0% of 2-p-octyloxyphenyl-5-heptylpyrimidine,
10.0% of 2-p-hexyloxyphenyl-5-heptylpyrimidine and
11.0% of 2-p-octylphenyl-5-p-pentyloxyphenylpyrimidine
can be supercooled to about 10° and has an $S_C/S_A$ of 55°, an $S_A/N$ of 68.5° and N/I of 75°.

EXAMPLE 25

A liquid crystal phase consisting of
40% of 2-p-decanoyloxyphenyl-5-octylpyrimidine,
20% of 2-p-heptanoyloxyphenyl-5-octylpyrimidine, 20% of 2-p-octanoyloxyphenyl-5-octylpyrimidine,
8% of 2-p-hexanoyloxyphenyl-5-octylpyrimidine,
8% of 2-p-octylphenyl-5-p-pentyloxyphenylpyrimidine and
4% of 2-p-hexylphenyl-5-p-hexyloxyphenylpyrimidine
has an $S_C/S_A$ of 57.5°, an $S_A/N$ of 67° and N/I of 74°.

EXAMPLE 26

A liquid crystal phase consisting of
23% of 2-p-nonyloxyphenyl-5-nonylpyrimidine,
18% of 2-p-decyloxyphenyl-5-heptylpyrimidine,
15% of 2-p-nonyloxyphenyl-5-heptylpyrimidine,
8% of 2-p-nonanoyloxyphenyl-5-nonylpyrimidine,
8% of 2-p-undecanoyloxyphenyl-5-nonylpyrimidine,
10% of 2-p-octylphenyl-5-p-octyloxyphenylpyrimidine,
7% of 2-p-nonylphenyl-5-p-pentyloxyphenylpyrimidine and
11% of 2-p-pentylphenyl-5-p-hexyloxyphenylpyrimidine
has an $S_C/S_A$ of 63°, an $S_A/N$ of 74° and N/I of 81°.

EXAMPLE 27

A liquid crystal phase consisting of
42% of 2-p-decanoyloxyphenyl-5-octylpyrimidine,
23% of 2-p-heptanoyloxyphenyl-5-octylpyrimidine,
18% of 2-p-octanoyloxyphenyl-5-octylpyrimidine,
10% of 2-p-hexanoyloxyphenyl-5-octylpyrimidine and
7% of 2-p-2-oxadodecylphenyl-5-octylpyrimidine
is prepared.

EXAMPLE 28

A liquid crystal phase consisting of
25% of 2-p-decyloxyphenyl-5-heptylpyrimidine,
25% of 2-p-nonyloxyphenyl-5-nonylpyrimidine,
10% of 2-p-hexyloxyphenyl-5-nonylpyrimidine,
10% of 2-p-nonyloxyphenyl-5-heptylpyrimidine,
11% of 2-p-octyloxyphenyl-5-heptylpyrimidine,
11% of 2-p-heptyloxyphenyl-5-heptylpyrimidine and
8% of 2-p-decyloxyphenyl-5-(trans-4-octylcyclohexyl)-pyrimidine
is prepared.

EXAMPLE 29

A liquid crystal phase consisting of
20% of 2-p-nonyloxyphenyl-5-nonylpyrimidine,
10% of 2-p-nonyloxyphenyl-5-heptylpyrimidine,
18% of 2-p-decyloxyphenyl-5-octylpyrimidine,
15% of 2-p-nonyloxyphenyl-5-octylpyrimidine,
15% of 2-p-octyloxyphenyl-5-octylpyrimidine,
12% of 2-p-heptyloxyphenyl-5-octylpyrimidine and
10% of 2-p-(1,4-dioxaundecyl)-phenyl-5-nonylpyrimidine.

A suitable chiral doping substance can be added to all the achiral base mixtures given as examples, and these can be used as ferroelectric materials.

EXAMPLE 30

A solution of 0.01 m of n-butyl-lithium (15% in n-pentane) is added dropwise to a solution of 0.01 m (2.7 g) of 3-(4-heptyloxyphenyl)-pyridine (which is obtainable by coupling of 4-heptyloxyphenylmagnesium bromide and 3-bromopyridine) in 30 ml of dry toluene at +15° C. under nitrogen. The reaction mixture is then boiled under reflux for a further 4 hours and, after cooling, hydrolysed carefully with 10 ml of water. The organic phase is washed with water and saturated NaCl solution, dried with magnesium sulfate and evaporated. The oily residue is purified by chromatography over a silica gel column with diisopropyl ether as the mobile phase. 2-Butyl-5-p-heptyloxyphenylpyridine, Cr. 80°, is obtained.

EXAMPLE 31

A solution of 0.01 m of 4-heptyloxyphenyllithium, prepared from 4-bromoheptyloxybenzene and lithium, in 30 ml of toluene is added dropwise to a solution of 0.01 m of 3-pentylpyridine, which is obtainable by coupling pentylmagnesium bromide and 3-bromopyridine, in 30 ml of toluene at −20° C. under nitrogen. The reaction mixture is heated at the boiling point for 4 hours and, after cooling, is carefully hydrolysed with 10 ml of water. The organic phase is washed with water and saturated NaCl solution, dried with magnesium sulfate and evaporated. The residue is purified over a silica gel column with diisopropyl ether as the mobile phase. 2-p-Heptyloxyphenyl-5-pentylpyrimidine is obtained.

The homologous 2-p-alkoxyphenyl-5-alkylpyridines are prepared analogously.

EXAMPLE 32

A liquid crystal phase consisting of
3% of 2-p-hexyloxyphenyl-5-heptylpyrimidine,
6% of 2-p-hexyloxyphenyl-5-nonylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
20% of 2-p-nonyloxyphenyl-5-nonylpyrimidine,
10% of 2-p-(trans-4-propylcyclohexyl)-phenyl-5-pentylpyridine,
25% of r-1-cyano-cis-4-(4'-octyloxybiphenyl-4-yl)-1-butylcyclohexane,
13% of r-1-cyano-cis-4-(4'-heptylbiphenyl-4-yl)-1-hexylcyclohexane,
5% of r-1-cyano-cis-4-(trans-4-pentylcyclohexyl)-1-(trans-4-pentylcyclohexyl)-cyclohexane and
9% of optically active R-4-(5-hexylpyrimidin-2-yl)phenyl-2-chloropropionate
displays Cr. −10° Sc* 68° $S_A$* 73° Ch 99° I and spontaneous polarization of 8.1 nC/cm².

EXAMPLE 33

A liquid crystal phase consisting of
3% of 2-p-hexyloxyphenyl-5-heptylpyrimidine,
3% of 2-p-hexyloxyphenyl-5-nonylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
22% of 2-p-nonyloxyphenyl-5-nonylpyrimidine,
21% of r-1-cyano-cis-4-(4'-octyloxybiphenyl-4-yl)-1-octylcyclohexane,
10% of r-1-cyano-cis-4-(4'-heptylpiphenyl-4-yl)-1-hexylcyclohexane,
5% of 2-p-pentyloxyphenyl-5-hexylpyridine,
5% of 2-p-heptanoylphenyl-5-hexylpyridine,
10% of optically active 1-(4'-pentylbiphenyl-4-yl)-2-(1-cyano-3-methylcyclohexyl)-ethane and
12% of optically active r-1-cyano-cis-4-(4'-heptylbiphenyl-4-yl)-1-(2-methylbutyl)-cyclohexane
exhibits Cr. −15° Sc* 58° $S_A$* 64° Ch 82° I and spontaneous polarization of 20 nC/cm².

EXAMPLE 34

A liquid crystal phase consisting of
3% of 2-p-hexyloxyphenyl-5-heptylpyrimidine,
3% of 2-p-hexyloxyphenyl-5-nonylpyrimidine, 3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
20% of 2-p-nonyloxyphenyl-5-nonylpyrimidine,
3% of 2-p-pentyloxyphenyl-5-hexylpyridine,
3% of 2-p-hexyloxyphenyl-5-hexylpyridine,
3% of 2-p-hexyloxyphenyl-5-octylpyridine,
30% of r-1-cyano-cis-4-(4'-octyloxybiphenyl-4-yl)-1-octylcyclohexane,
16% of r-1-cyano-cis-4-(4'-heptylbiphenyl-4-yl)-1-hexylcyclohexane and
10% of ethyl 2-[p-(5-nonylpyrimidin-2-yl)-phenoxy]-propanoate (optically active)

exhibits Cr. $-21°$ Sc* $61°$ $S_A$* $65°$ Ch $81°$ I and spontaneous polarization of 9 nC/cm$^2$.

EXAMPLE 35

A liquid crystal phase consisting of
30% of 2-p-nonyloxyphenyl-5-nonylpyrimidine,
3% of 2-p-hexylmercaptophenyl-5-heptylpyrimidine,
3% of 2-p-heptylmercaptophenyl-5-heptylpyrimidine,
3% of 2-p-octylmercaptophenyl-5-heptylpyrimidine,
11% of r-1-cyano-cis-4-(4'-pentylbiphenyl-4-yl)-1-octylcyclohexane,
10% of r-1-cyano-cis-4-(4'-heptylbiphenyl-4-yl)-1-butylcyclohexane,
20% of r-1-cyano-cis-4-(4'-nonyloxybiphenyl-4-yl)-1-octylcyclohexane and
10% of R-4-(5-hexylpyrimidin-2-yl)-phenyl-2-chloropropionate exhibits Cr. $-10°$ Sc* $61°$ $S_A$* $66°$ Ch 85 I and spontaneous polarization of 12 nC/cm$^2$.

EXAMPLE 36

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
30% of r-1-cyano-cis-4-(4'-octylbiphenyl-4-yl)-1-butylcyclohexane,
3% of p-hexyloxyphenyl 5-heptylpicolinate,
3% of p-hexyloxyphenyl 5-heptyloxypicolinate,
3% of p-octyloxyphenyl 5-nonylpicolinate and
10% of chiral R-4-(5-hexylpyrimid-2-yl)-phenyl 2-chloropropionate exhibits Cr. $-12°$ Sc* $65°$ $S_A$* $69°$ Ch $89°$ I and spontaneous polarization of 12 nC/cm$^2$.

EXAMPLE 37

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
5% of 2-p-pentyloxyphenyl-5-hexylpyridine,
5% of 2-p-hexyloxyphenyl-5-heptylpyridine,
30% of r-1-cyano-cis-4-(4'-octyloxybiphenyl-4-yl)-1-octylcyclohexane,
14% of optically active r-1-cyano-cis-4-(4'-heptyloxybiohenyl-4-yl)-1-(2-methylbutyl)-cyclohexane and
11% of optically active 1-(4'-pentylbiphenyl-4-yl)-2-(1-cyano-3-methylcyclohexyl)-ethane exhibits Cr. $-25°$ Sc* $67°$ $S_A$* $74°$ Ch $88°$ I and spontaneous polarization of 27 nC/cm$^2$.

EXAMPLE 38

A liquid crystal phase which consists of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 6-pentyloxypyridazin-3-yl p-hexyloxybenzoate,
3% of 6-heptyloxypyridazin-3-yl p-hexyloxybenzoate,
3% of 6-heptyloxypyridazin-3-yl p-heptyloxybenzoate and
10% of chiral R-4-(5-hexylpyrimid-2-yl)-phenyl 2-chloropropionate is prepared

EXAMPLE 39

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 6-(p-heptyloxyphenyl)-3-hexylpyridazine,
3% of 6-(p-heptyloxyphenyl)-3-heptylpyridazine,
3% of 6-(p-nonyloxyphenyl)-3-heptylpyridazine and
10% of chiral R-4-(5-hexylpyrimid-2-yl)-phenyl 2-chloropropionate
is prepared.

EXAMPLE 40

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-nonyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of R-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 1-(p-heptyloxyphenyl)-2-(5-heptylpyridine-2-yl)-ethane,
3% of 1-(p-nonyloxyphenyl)-2-(5-heptylpyridine-2-yl)-ethane, 3% of 1-(p-nonyloxyphenyl)-2-(5-nonylpyridine-2-yl)-ethane and 10% of chiral R-4-(5-hexylpyrimid-2-yl)-phenyl 2-chloropropionate is prepared.

EXAMPLE 41

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 1(trans-4-heptylcyclohexyl)-2-(5-heptyloxypyridin-2-yl)-ethane,
3% of 1(trans-4-heptylcyclohexyl)-2-(5-octyloxypyridin-2-yl)-ethane,
3% of 1(trans-4-heptylcyclohexyl)-2-(5-nonyloxypyridin-2-yl)-ethane and
10% of chiral R-4-(5-hexylpyrimid-2-yl)-phenyl 2-chloropropionate.

EXAMPLE 42

A liquid of crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 2-(4'-heptyloxybiphenyl-4-yl)-5-heptylpyrimidine,
3% of 2-(4'-octyloxybiphenyl-4-yl)-5-heptylpyrimidine,
3% of 2-(4'-nonyloxybiphenyl-4-yl)-5-nonylpyrimidine and
10% of chiral R-4-(5-hexylpyrimid-2-yl)-phenyl-2-chloropropionate
is prepared.

EXAMPLE 43

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 2-(4'-heptyloxybiphenyl-4-yl)-5-heptylpyrimidine,
3% of 2-(4'-octyloxybiphenyl-4-yl)-5-heptylpyrimidine,
3% of 2-(4'-nonyloxybiphenyl-4-yl)-5-nonylpyrimidine and
10% of chiral R-4-(5-hexylpyrimid-2-yl)-phenyl-2-chloropropionate
is prepared.

EXAMPLE 44

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
30% of r-1-cyano-cis-4-(4'-octyloxybiphenyl-4-yl)-1-octylcyclohexane,
10% of r-1-cyano-cis-4-(4'-heptylbiphenyl-4-yl)-1-hexylcyclohexane,
6% of r-1-cyano-cis-4-(4'-octylbiphenyl-4-yl)-1-butylcyclohexane,
3% of 2-p-heptyloxyphenyl-5-heptyloxypyrazine,
3% of 2-p-nonyloxyphenyl-5-heptyloxypyrazine,
3% of 2-p-nonyloxyphenyl-5-nonyloxypyrazine and
10% of chiral R-4-(5-hexylpyrimid-2-yl)-phenyl-2-chloropropionate
is prepared.

EXAMPLE 45

A liquid crystal phase consisting of the following racemic compounds:
10% of 2-p-(4-methylhexyloxyphenyl)-5-heptylpyrimidine (m.p. 29°, clear point 60°)
6% of 2-p-(6-methyloctyloxyphenyl)-5-octylpyrimidine (m.p. 3°, clear point 56°)
8% of 2-p-(5-methylheptyloxyphenyl)-5-nonylpyrimidine (m.p. 10°, clear point 59°)
4% of 2-p-(4-methylhexyloxyphenyl)-5-decylpyrimidine (m.p. 3°, clear point 58°,
8% of 2-p-(5-methylheptyloxyphenyl)-5-undecylpyrimidine (m.p. 20°, clear point 59°),
3% of 2-p-(4-methylhexyloxyphenyl)-5-dodecylpyrimidine (m.p. 41°, clear point 62°),
6% of 2-p-(5-methylheptyloxyphenyl)-5-dodecylpyrimidine (m.p. 23°, clear point 62°) and
30% of r-1-cyano-cis-4(4'-octyloxybiphenyl-4-yl)-1-octylcyclohexane
15% of r-1-cyano-cis-4-(4'-octylbiphenyl-4-yl)-1-butylcyclohexane
and 10% of optically active R-4-(5-hexylpyrimid-2-yl)-phenyl 2-chloropropionate exhibits Cr. −18°Sc* 66° $S_A$* 70° Ch 82° I, spontaneous polarization of 8 nC/cm$^2$ and a switching time of 350 μs for 2 μm at 12 V and 20°.

EXAMPLE 46

A liquid crystal phase consisting of the following racemic compounds:
10% of 2-p-(4-methylhexyloxyphenyl)-5-heptylpyrimidine (m.p. 29°, clear point 60°)
6% of 2-p-(6-methyloctyloxyphenyl)-5-octylpyrimidine (m.p. 3°, clear point 56°)
8% of 2-p-(5-methylheptyloxyphenyl)-5-nonylpyrimidine (m.p. 10°, clear point 59°)
4% of 2-p-(4-methylhexyloxyphenyl)-5-decylpyrimidine (m.p. 3°, clear point 58°,
8% of 2-p-(5-methylheptyloxyphenyl)-5-undecylpyrimidine (m.p. 20°, clear point 59°), 3% of 2-p-(4-methylhexyloxyphenyl)-5-dodecylpyrimidine (m.p. 41°, clear point 62°),
6% of 2-p-(5-methylheptyloxyphenyl)-5-dodecylpyrimidine (m.p. 23°, clear point 62°)
30% of r-1-cyano-cis-4(4'-octyloxybiphenyl-4-yl)-1-octylcyclohexane
15% of r-1-cyano-cis-4-(4'-octylbiphenyl-4-yl)-1-butylcyclohexane
6% of optically active 1-(4'-pentylbiphenyl-4-yl)-2-(1-cyano-3-methylcyclohexyl)-ethane and
4% of optically active 2-octyl p-[p-(5-nonylpyrimid-2-yl)-phenoxymethyl]-benzoate
exhibits Cr. −15° Sc* 60° S$_A$* 66° Ch 80° I, spontaneous polarization of 9 nC/cm$^2$ and a switching time of 300 μs for 2 μm at 12 V and 20°.

EXAMPLE 47

A liquid crystal phase consisting of
3% of 2-p-hexyloxyphenyl-5-heptylpyrimidine,
3% of 2-p-heptyloxyphenyl-5-heptylpyrimidine,
3% of 2-p-(5-methylheptyloxyphenyl)-5-heptylpyrimidine (racemate),
3% of 2-p-nonyloxyphenyl-5-heptylpyrimidine,
7% of 2-p-hexyloxyphenyl-5-nonylpyrimidine,
23% of 2-p-nonyloxyphenyl-5-nonylpyrimidine,
32% of r-1-cyano-cis-4-(4'-octyloxybiphenyl-4-yl)-1-octylcyclohexane,
13% of r-1-cyano-cis-4-(4'-heptylbiphenyl-4-yl)-1-hexylcyclohexane,
3% of r-1-cyano-cis-4-(trans-4-pentylcyclohexyl)-1-(trans-4-pentylcyclohexyl)-cyclohexane and
10% of optically active ethyl 2-[p-(5-nonylpyrimidin-2-yl)-phenoxy] propanoate
exhibits Cr. < −30° Sc* 59° S$_A$*.

EXAMPLE 48

A liquid crystal phase consisting of
3% of 2-p-hexyloxyphenyl-5-heptylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
15% of r-1-cyano-cia-4-(4'-octylbiphenyl-4-yl)-1-butylcyclohexane,
30% of r-1-cyano-cis-4-(4'-octyloxybiphenyl-4-yl)-1-octylcyclohexane,
3% of S-(6-nonyloxypyridazin-3-yl p-octylthiobenzoate
7% of optically active 1-(4'-pentylbiphenyl-4-yl)-2-(1-cyano-3-methylcyclohexyl)-ethane and
10% of optically active r-1-cyano-cis-4-(4'-heptyloxybiphenyl-4-yl)-1-(3-methylbutyl-cyclohexane
exhibits Sc* 63° S$_A$* 66° Ch 84° I and spontaneous polarization of 20 nC/cm$^2$.

In the mixture of optically active materials used in Examples 33, 37, 46 and 48, the addition made in each case is intended to produce a right-handed twist, whereas the other addition is intended to produce a left-handed twist.

EXAMPLE 49

A liquid crystal phase consisting of
3% of 2-p-hexyloxyphenyl-5-octylpyrimidine,
3% of 2-p-heptyloxyphenyl-5-heptylpyrimidine,
3% of 2-p-octyloxyphenyl-5-heptylpyrimidine,
3% of 2-p-nonyloxyphenyl-5-heptylpyrimidine,
3% of 2-p-hexyloxyphenyl-5-nonylpyrimidine,
20% of 2-p-nonyloxyphenyl-5-nonylpyrimidine,
3% of 3-p-pentyloxyphenyl-6-hexyloxypyridazine,
3% of 3-p-pentyloxyphenyl-6-octyloxypyridazine,
3% of 3-p-hexyloxyphenyl-6-hexyloxypyridazine,
25% of r-1-cyano-cis-4-(4'-octylbiphenyl-4-yl)-1-butylcyclohexane,
10% of r-1-cyano-cis-4-(4'-heptylbiphenyl-4-yl)-1-hexyl-cyclohexane,
5% of r-1-cyano-cis-4-(trans-4-pentylcyclohexyl)-1-(trans-4-pentylcyclohexyl)-cyclohexane,
5% of r-1-cyano-cis-4-(4'-nonyloxybiphenyl-4-yl)-1-octylcyclohexane and
11% of optically active ethyl 2-[p-(5-nonylpyrimidin-2-yl)-phenoxy]-propanoate exhibits Sc* 58° S$_A$* 64° Ch 79° I and spontaneous polarization of 8 nC/cm$^2$.

We claim:
1. In a liquid crystal phase having ferroelectric properties useful for rapidly switching displays and comprising at least two liquid crystalline compounds which form an a chiral base mixture having a tilted smectic phase and a chiral doping substance, the improvement where at least three compounds of the achiral base mixture are of the formula I

$$R^1-A^1-A^2-R^2 \qquad \text{I}$$

wherein
R$^1$ and R$^2$ are each alkyl of 1–15 C atoms wherein one or two non-adjacent CH$_2$ groups can be replaced by —O—, —S—, —CO—, —O—CO—, —CO—O—, —CO—S—, —S—CO— and/or —CH=CH—,
A$^1$ is 1,4-phenylene, trans-1,4-cyclohexylene or a single bond and
A$^2$ is

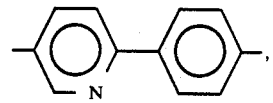,

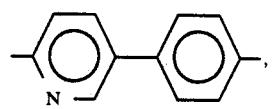,

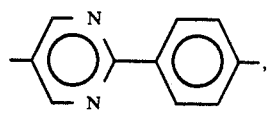,

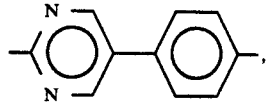,

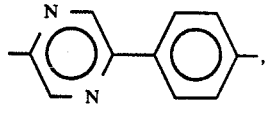,

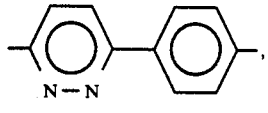,

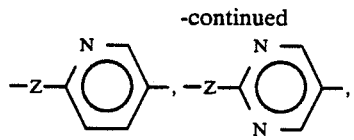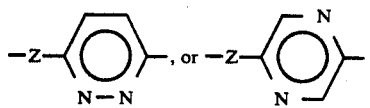
in which Z is —O—CO—, —CO—O, —S—CO—, —CO—S—, —CH₂O—, —OCH₂— or —CH₂CH₂—, with the proviso that, if A¹ is a single bond, A² is
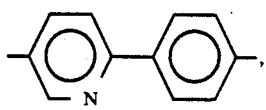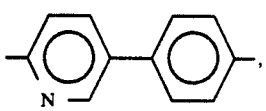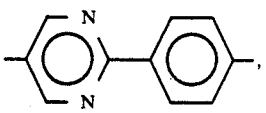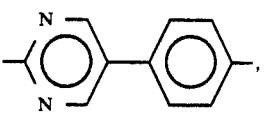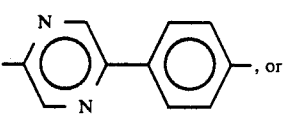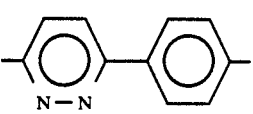
2. A phase of claim 1, wherein in formula I, A¹ is a single bond and A² is
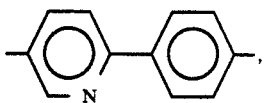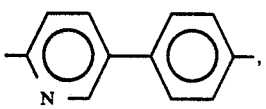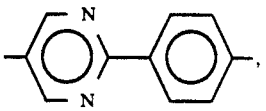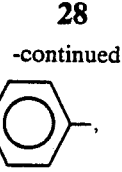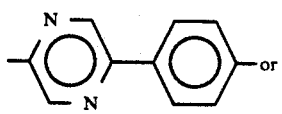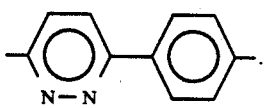
3. A phase of claim 3, wherein A² is
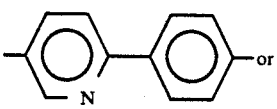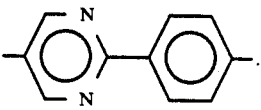
4. A phase of claim 3, wherein A² is
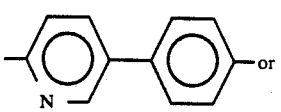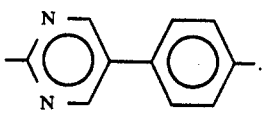
5. A phase of claim 3, wherein A² is
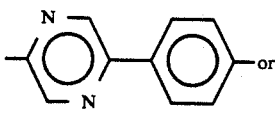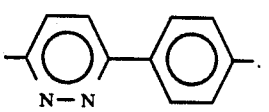
6. A phase of claim 1, wherein in formula I, A¹ is 1,4-phenylene or trans-1,4-cyclohexylene and A² is
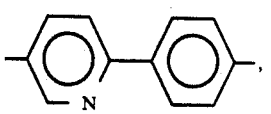

-continued

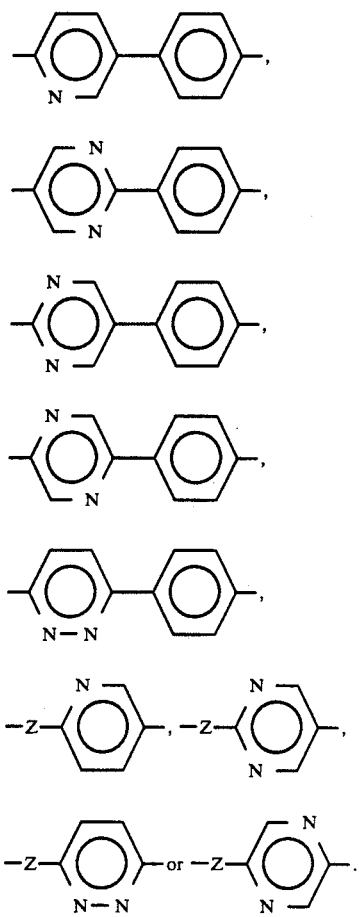

7. A phase of claim 6, wherein A² is

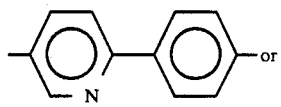

8. A phase of claim 6, wherein A² is

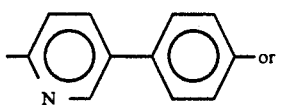

9. A phase of claim 6, wherein A² is

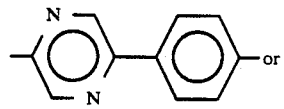

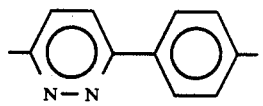

10. A phase of claim 6, wherein A² is

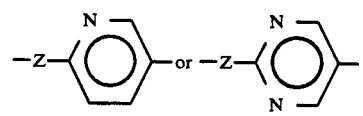

11. A phase of claim 6, wherein A² is

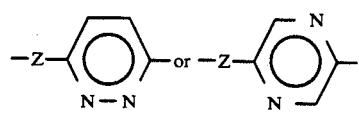

12. A phase of claim 7, which contains at least one compound of the formula

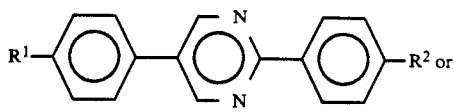

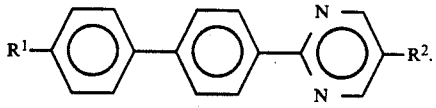

13. A phase of claim 10, wherein Z is —O—CO— or —CO—O—.

14. A phase of claim 11, wherein Zi —O—CO— or —CO—O—.

15. A phase of claim 1, wherein A¹ is a single bond, R¹ is n-alkyl of 7 to 10 C atoms, and R² is n-alkoxy of 6 to 12 C atoms.

16. A phase of claim 15, wherein R¹ is n-heptyl, n-octyl or n-nonyl.

17. A phase of claim 1, containing at least one compound of formula I having R¹=n-nonyl and simultaneously at least one compound of formula I wherein R¹ is n-heptyl or n-octyl.

18. A phase of claim 1, containing at least one compound of formula I wherein R² is n-hexyloxy, n-heptyloxy or n-octyloxy and at least one compound of formula I wherein R² is n-nonyloxy or n-decyloxy.

19. A phase of claim 18, containing at least one compound of formula I wherein R² is n-heptyloxy or n-octyloxy.

20. A phase of claim 1, wherein A¹ is a single bond and the sum of the C atoms in the groups R¹ and R² is 15 or more.

21. A phase of claim 20, wherein the sum of the C atoms in the groups R¹ and R² is 15 to 20.

22. A phase o claim 1, wherein $R^1$ is n-alkyl of 7 to 10 C atoms and $R^2$ is n-alkanoyloxy, n-alkoxycarbonyl or n-alkylthio with in each case 5 to 10 C atoms.

23. A phase of claim 1, containing at least one compound of formula I wherein $A^1$ is 1,4-phenylene or trans-1,4-cyclohexylene.

24. A phase of claim 1, containing at least one compound of formula I wherein $R^2$ is n-alkylthio.

25. A phase of claim 1, containing only compounds of the formula I in which $A^1$ is a single bond.

26. A phase of claim 1, containing at least one compound of formula i in which at least one group $R^1$ or $R^2$ is a branched alkyl or alkoxy radical.

27. A phase of claim 1, containing compounds of the formula I in which $R^1$ and $R^2$ independently of one another are each alkyl, alkoxy, alkanoyloxy, alkoxy-carbonyl or alkoxycarbonyloxy, each having 5 to 12 C atoms.

28. A phase of claim 27, containing compounds of the formula i in which $R^1$ and $R^2$ independently of one another are each alkyl or alkoxy.

29. A phase of claim 28, containing compounds of the formula I in which $R^1$ is alkyl or alkoxy and $R^2$ is alkoxy.

30. A phase of claim 27, containing compounds of the formula I having $R^1$ and $R^2$ groups with a straight-chain alkyl radical.

31. A phase of claim 27, containing compounds of the formula i in which one of the groups $R^1$ and $R^2$ is alkyl.

32. A phase of claim 1, containing compounds of the formula I in which $R^1$ is n-alkyl of 7 to 10 C atoms and $R^2$ is $CH_2O (CH_2)p—CH_3$ or $—O—(Ch_2)_q—O—(CH_2)_r—CH_3$, wherein p is 4 to 10, q is 1 to 5 and r is 4 to 10.

33. A phase of claim 1, containing at least one compound of formula I wherein $A^1$ is 1,4-phenylene or a single bond and $A^2$ is

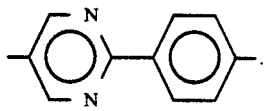

34. A phase of claim 33, wherein $A^1$ is a single bond.

35. A phase of claim 1, containing at least one compound of the formula

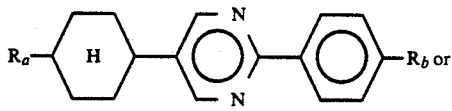

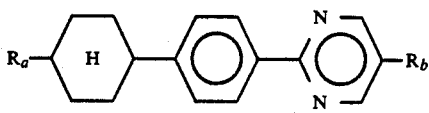

wherein $R_a$ is alkyl of 3 to 12 C atoms and $R_b$ is alky or alkoxy in each case of 5 to 12 C atoms.

36. A phase of claim 1, containing a liquid crystal component with negative dielectric anisotropy.

37. A phase of claim 36, containing at least one compound containing the structural element A, B or C as the component with negative dielectric anisotropy.

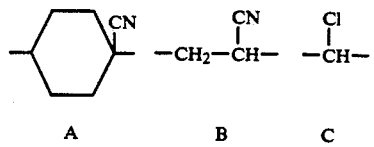

38. A phase of claim 1, containing at least one compound of the formula II $$R^4—A^1—COX—A^2—R^5 \qquad \text{II}$$

wherein $R^4$ and $R^5$ are each alkyl of 1-15 C atoms, in each of which one or two non-adjacent $CH_2$ groups can be replaced by $—O—$, $—CO—$, $—O—CO—$, $—CO—O—$ and/or $—CH=CH—$, X is O or S and $A^1$ and $A^2$ are each 1,4-phenylene or trans-1,4-cyclohexylene, or one of the groups $A^1$ and $A^2$ is optionally also 4,4'-biphenylyl or trans, trans-4,4'-bicyclohexyl.

39. A phase of claim 1, containing at least one compound of the formula V $$R^1—Q^1—A—(Q^2)_q—R^2 \qquad \text{V}$$

wherein $R^1$ and $R^2$ independently of one another are each a straight-chain alkyl group of 1 to 15 C atoms, wherein one or more non-adjacent $Ch_2—$ groups may be replaced by $—O—$, $—S—$, $—CO—$, $—CHCH_3—O—$, $—CHCH_3—$, $—CH—halogen—$, $—CHCN—$, $—O—CO—$, $—O—COO—$, $—CO—O—$ and/or $—CH=CH—$, A is

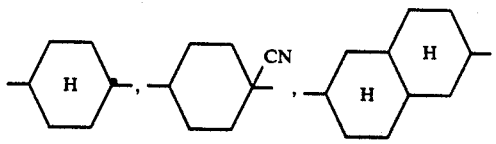

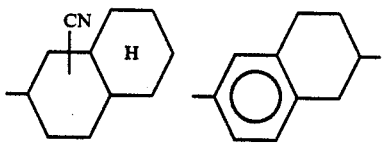

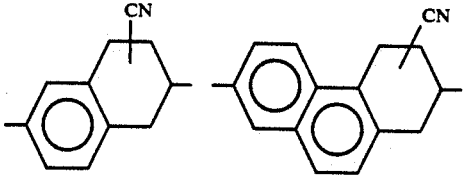

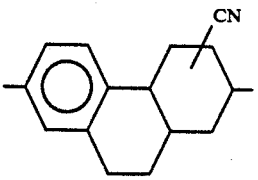

-continued

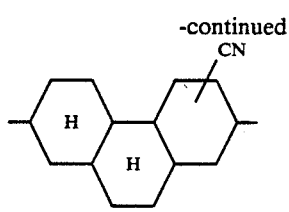

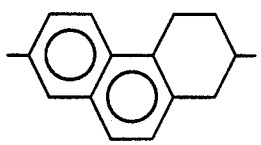

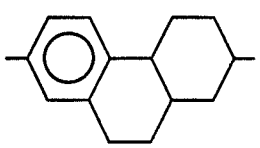

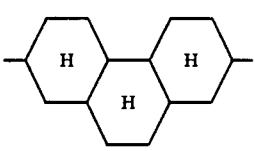

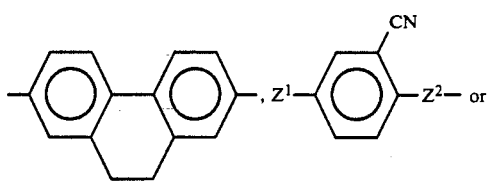

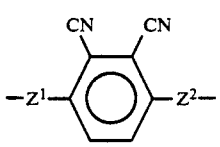

q is 0 or 1,
$Q^1$ and $Q^2$ independently of one another are each $-(A^O-A^O)_p-$, wherein
$A^O$ is 1,4-cyclohexylene which si unsubstituted or monosubstituted or polysubstituted by halogen atoms, $CH_3$ groups and/or nitrile groups, and wherein furthermore one or two non-adjacent $CH_2$ groups may be replaced by —O— and/or —S— and/or a

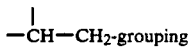

may be replaced by

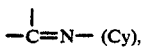

or is 1,4-phenylene which is unsubstitued or monosubstituted or polysubstituted by halogen atoms, $CH_3$ groups and/or nitrile groups, wherein furthermore one or more CH groups may be replaced by N (Ph), and one of the radicals $A^O$ may furthermore be 2,6-naphthylene (Na) or tetrahydro-2,5-naphthylene (4H-Na), both optionally substituted by halogen or CN, $Z^0$, $Z^1$ and $Z^2$ independently of one another are each —CO—O—, —O—CO—, —$CH_2$O—, —O$CH_2$—, $CH_2CH_2$—, —CHCN—$CH_2$—, —$CH_2$—CHCN— or a single bond, and p is 1, 2 or 3, or when A is tetra- octahydrophenanthrene, also 0,
and wherein when A is

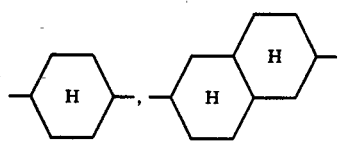

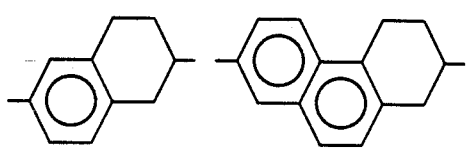

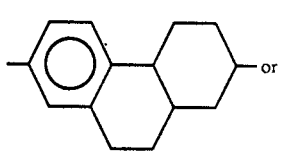

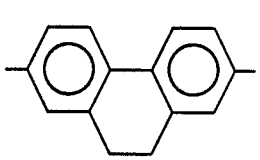

at least one group $Z^0$ is —CHCN—$CH_2$— or —$CH_2$—CHCN— and/or at least one $CH_2$ group in at least one of the groups $R^1$ and $R^2$ is replaced by —CHCN—.

40. A phase of claim 39, containing achiral compounds of the formula V and doped with chiral compounds of the formula I or additionally with other chiral compounds.

41. A phase of claim 39, containing at least one compound of the formulae V1 to VB18:

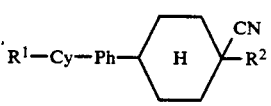

V1

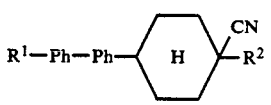

V2

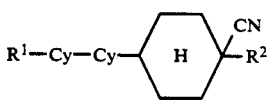

V3

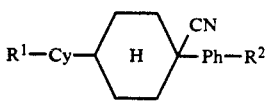

V4

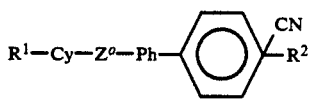
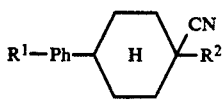
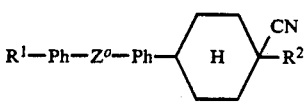
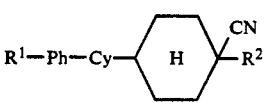
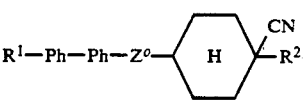
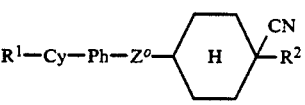
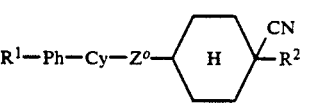
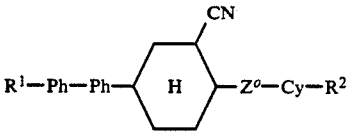
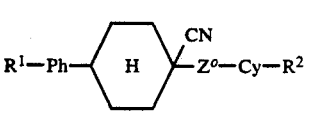
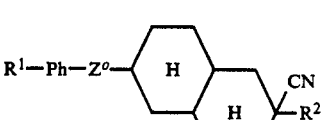
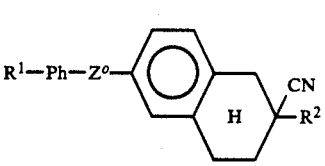

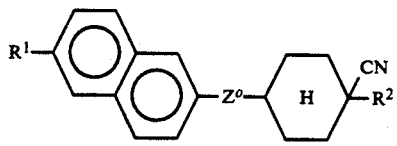
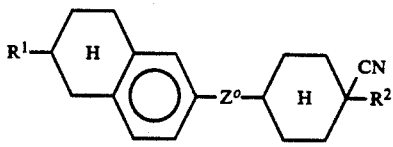

42. A phase of claim 1, containing at least one compound of the formulae V19 to V22:

$$R^1-A^O-Cy-(CH_2)_r-CHCN-C_sH_{2s+1} \quad V19$$

$$R^1-A^O-A^O-Cy-(CH_2)_r-CHCN-C_sH_{2s+1} \quad V20$$

$$R^1-A^OA^O-CHCN-Ch_2-Cy-R^2 \quad V21$$

$$R^1-A^P-A^O-CH_2-CHCN-Cy-R^2 \quad V22$$

wherein
r is 0, 1, 2 or 3 and
(r+s) is 1 to 14.

43. A phase of claim 1, containing at least three compounds of formula I.

44. A phase of claim 43, containing at least five compounds of formula I.

45. A phase of claim 1, containing at least one other component with a negative or low positive dielectric anisotropy.

46. A phase of claim 45, wherein this (these) other component(s) make up 1 to 50% of the total phase.

47. A phase of claim 45, wherein the other component(s) is (are) of the formulae IIa to IIi:

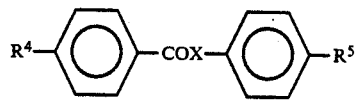
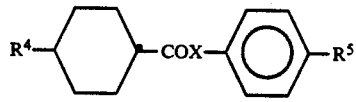
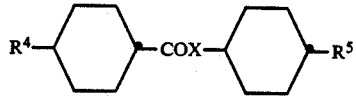
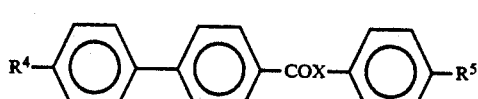
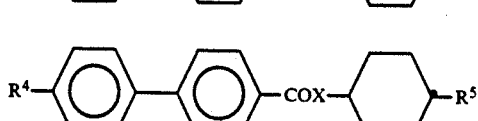

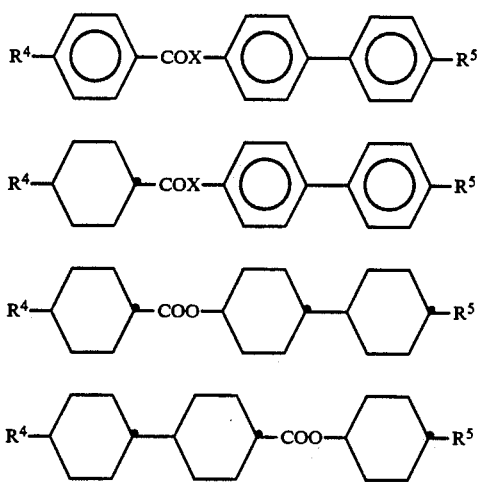

wherein
R⁴ and R⁵ are in each case straight-chain alkyl, alkoxy, alkanoyloxy or alkoxycarbonyl with in each case 3 to 12 C atoms, X is O or S, and in the compounds of the formulae IIa, IIb, IId, IIe, IIf and IIg, a 1,4-phenylene group is optionally laterally substituted by halogen or CN.

48. A phase of claim 47, containing compounds of the part formulae IIa, IIb, IId or IIf, wherein R⁴ and R⁵ are each straight-chain alkyl or alkoxy in each case of 5 to 10 C atoms.

49. A phase of claim 47, containing at least one of the individual compounds shown in the following table:

| Formula | R⁴ | R⁵ | X |
|---|---|---|---|
| IIa | n-Decyloxy | n-Heptyloxy | O |
| IIa | n-Hexyloxy | n-Decyloxy | O |
| IIa | n-Octyloxy | n-Heptyl | O |
| IIa | n-Octyloxy | n-Pentyl | O |
| IIa | n-Decyloxy | n-Heptyl | O |
| IIa | n-Decyloxy | n-Pentyl | O |
| IIf | n-Pentyl | n-Pentyl | O |
| IIf | n-Pentyl | n-Hexyl | O |

50. A phase of claim 1, containing at least one compound of the formula

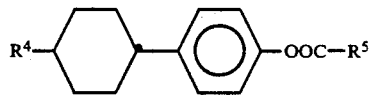

wherein R⁴ and R⁵ are straight-chain alkyl of 2 to 7 C atoms.

51. A phase of claim 1, containing at least one compound of the formula

R'—Q³—Q⁴-R'''     IIIc wherein R' is a straight-chain alkyl or alkoxy group in each case of 2 to 10 C atoms, Q³ and Q⁴ are each 1,4-phenylene, 4,4'-biphenylyl or trans-1,4-cyclohexylene, and one of the groups Q³ and Q⁴ can also be 1,4-phenylene, wherein at least one CH group is replaced by N, R''' is an optically active radical with an asymmetric carbon atom of the structure

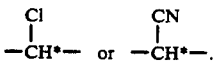

52. A phase of claim 51, containing at least one compound of the formula IIIc':

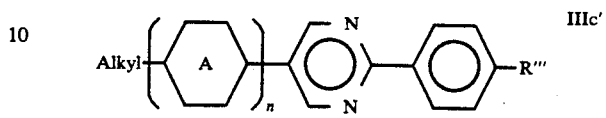

wherein A is 1,4-phenylene or trans-1,4-cyclohexylene and n is 0 or 1.

53. A phase of claim 52, wherein A is 1,4-phenylene and n is 1.

54. A phase of claim 1, containing at least one chiral compound of the formulae

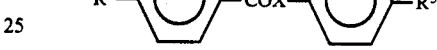

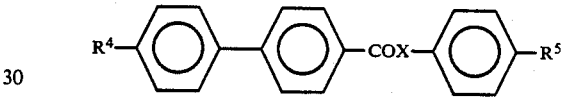

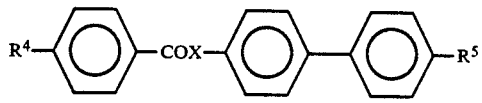

wherein R⁴ and R⁵ are each independently alkyl, alkoxy, alkanoyloxy or alkoxycarbonyl in each case of 3 to 12 C atoms and X is O or S.

55. A phase of claim 1, containing at least one compound of formula I wherein R¹ and R² are each independently alkyl of 5 to 12 C atoms or alkyl of 5 to 12 C atoms, wherein one CH₂ group is replaced by —O—, —S—, —CO—, —O—CO—, —CO—O—, —CO—S—, —S—CO— or —CH=CH—.

56. A phase of claim 1, containing at least one of the following compounds:
2-p-decyloxyphenyl-5-heptylpyrimidine,
2-p-nonyloxyphenyl-5-nonylpyrimidine,
2-p-hexyloxyphenyl-5-nonylpyrimidine,
2-p-nonyloxyphenyl-5-heptylpyrimidine,
2-p-octyloxyphenyl-5-heptylpyrimidine,
2-p-heptyloxyphenyl-5-heptylpyrimidine,
2-p-hexyloxyphenyl-5-heptylpyrimidine,
2-p-decyloxyphenyl-5-nonylpyrimidine,
2-p-heptyloxyphenyl-5-nonylpyrimidine,
2-p-octyloxyphenyl-5-nonylpyrimidine,
2-p-decyloxyphenyl-5-octylpyrimidine,
2-p-nonyloxyphenyl-5-octylpyrimidine,
2-p-octyloxyphenyl-5-octylpyrimidine,
2-p-heptyloxyphenyl-5-octylpyrimidine or
2-p-hexyloxyphenyl-5-octylpyrimidine.

57. A phase of claim 1, containing at least one of the following compounds:
2-(4'-heptyloxybiphenyl-4-yl)-5-heptylpyrimidine,
2-(4'-octyloxybiphenyl-3-yl)-5-heptylpyrimidine, or
2-(4'-nonyloxybiphenyl-4-yl)-5-nonylpyrimidine.

58. A phase of claim 1, containing at least one compound of formula I in which one of $R^1$ and $R^4$ is 4-methylhexyloxy, 5-methylheptyloxy or 6-methyloctyloxy and the other group $R^1$ or $R^2$ is a straight-chain alkyl group.

59. A phase of claim 58, containing at least one of the following compounds:
2-p-(4-methylhexyloxyphenyl)-5-heptylpyrimidine,
2-p-(6-methyloctyloxyphenyl)-5-octylpyrimidine,
2-p-(5-methylheptyloxyphenyl)-5-nonylpyrimidine,
2-p-(4-methylhexyloxyphenyl)-5-decylpyrimidine,
2-p-(5-methylheptyloxyphenyl)-5-undecylpyrimidine,
2-p-(4-methylhexyloxyphenyl)-5-dodecylpyrimidine or
2-p-(5-methylheptyloxyphenyl)-5-dodecylpyrimidine.

60. A phase of claim 1, containing at least one achiral compound of formula I.

61. A phase of claim 44, containing at least five achiral compounds of formula I.

62. In a ferroelectric electrooptical display element comprising a liquid crystal phase having ferroelectric properties, the improvement wherein the phase is one of claim 1.

63. A ferroelectric display element of claim 62 operating by the SSFLC mechanism.

64. A method of simultaneously improving the liquid crystal phase properties of ScI phases on supercooling down to temperatures below 0° C. and increasing the $S_A/S_C$ transition temperature of a liquid crystal phase having ferroelectric properties useful for rapidly switching displays and containing at least two liquid crystalline compound, comprising adding to the phase at least one compound of formula I $$R^1-A^1-A^2-R^2 \qquad (I)$$

wherein
$R^1$ is n-heptyl or n-octyl and at least one compound of formula I wherein $R^1$ is n-nonyl, wherein
$R^2$ is alkyl of 1-15 C atoms wherein one or two nonadjacent $CH_2$ groups can be replaced by —O—, —S—, —CO—, O—CO—, —Co—O—, —CO—S—, —S—CO—, —CHHalogen, —CHCN— and/or —CH=CH—,
$A^1$ is 1,4-phenylene, trans-1,4-cyclohexylene or a single bond and
$A^2$ is

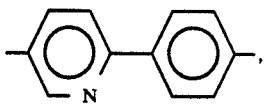,

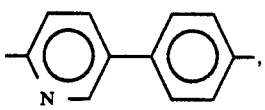,

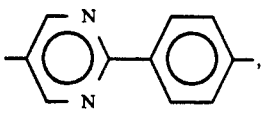,

-continued

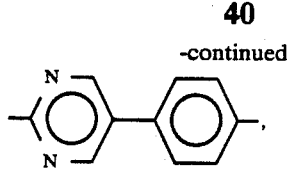,

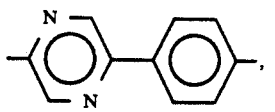,

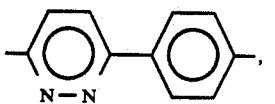,

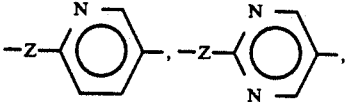,

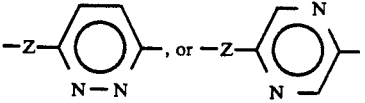

in which Z is —O—CO—, —CO—O—, —S—CO—, —CO—S—, —CH₂O—, —OCH₂— or —CH₂CH₂—, with the proviso that, if $A^1$ is a single bond, $A^2$ is

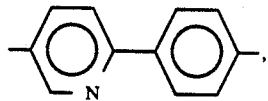,

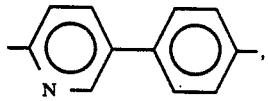,

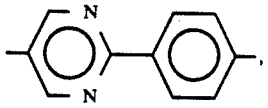,

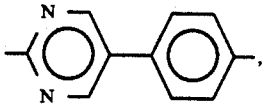,

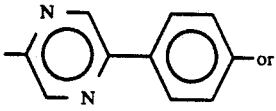or

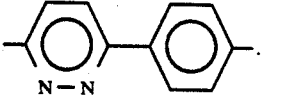.

* * * * *